US008166028B1

(12) United States Patent
Reynar et al.

(10) Patent No.: US 8,166,028 B1
(45) Date of Patent: Apr. 24, 2012

(54) METHOD, SYSTEM, AND GRAPHICAL USER INTERFACE FOR IMPROVED SEARCHING VIA USER-SPECIFIED ANNOTATIONS

(75) Inventors: Jeff Reynar, New York, NY (US);
Kushal B. Dave, New York, NY (US);
Eric S. Flatt, New York, NY (US);
Michael Stuart Gordon, Brooklyn, NY (US); Jeremy A. Hylton, Easton, PA (US); James K Scott, New York, NY (US); Oren Eli Zamir, Nyack, NY (US);
Jeffrey L. Korn, New York, NY (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 11/228,972

(22) Filed: Sep. 15, 2005

Related U.S. Application Data

(63) Continuation-in-part of application No. 11/097,884, filed on Mar. 31, 2005.

(51) Int. Cl.
*G06F 7/00* (2006.01)
(52) U.S. Cl. ........................................ 707/732
(58) Field of Classification Search ............... 707/3, 732
See application file for complete search history.

(56) References Cited

U.S. PATENT DOCUMENTS

| | | | | |
|---|---|---|---|---|
| 6,100,890 | A | 8/2000 | Bates et al. | 345/357 |
| 6,212,522 | B1 | 4/2001 | Himmel et al. | 707/10 |
| 6,285,999 | B1 | 9/2001 | Page | 707/5 |
| 6,321,228 | B1* | 11/2001 | Crandall et al. | 707/10 |
| 6,327,590 | B1 | 12/2001 | Chidlovskii et al. | 707/5 |
| 6,356,898 | B2 | 3/2002 | Cohen et al. | 707/5 |
| 6,460,060 | B1 | 10/2002 | Maddalozzo, Jr. et al. | 707/513 |
| 6,480,852 | B1 | 11/2002 | Himmel et al. | 707/10 |
| 6,832,218 | B1* | 12/2004 | Emens et al. | 1/1 |
| 6,892,198 | B2 | 5/2005 | Perisic et al. | 707/5 |
| 6,895,406 | B2 | 5/2005 | Fables et al. | 707/102 |
| 6,912,505 | B2 | 6/2005 | Linden et al. | 705/14 |

(Continued)

FOREIGN PATENT DOCUMENTS

EP          1050830 A2      11/2000

(Continued)

OTHER PUBLICATIONS

Brin, S., et al., "The Anatomy of a Large Scale Hypertextual Search Engine," 7th Int'l World Wide Web Conference, Brisbane, Australia, Apr. 14-18, 1998.

(Continued)

*Primary Examiner* — Apu Mofiz
*Assistant Examiner* — Ajith Jacob
(74) *Attorney, Agent, or Firm* — Morgan, Lewis & Bockius LLP

(57) ABSTRACT

A method, system, and graphical user interface for improved web searching via user-specified annotations are disclosed. One aspect of the invention involves a graphical user interface on a computer that includes a ranked set of links responsive to a search request by a user. At least some of the links are to documents that have not previously been rated by the user and at least some of the links are to documents that have previously been rated by the user. The links are displayed in an order that depends at least in part on the ratings of the documents that have previously been rated by the user.

34 Claims, 15 Drawing Sheets

U.S. PATENT DOCUMENTS

| | | | |
|---|---|---|---|
| 7,747,690 B2 | 6/2010 | Kraenzel et al. | |
| 2002/0184095 A1 | 12/2002 | Scullard et al. | 705/14 |
| 2002/0198882 A1 | 12/2002 | Linden et al. | 707/10 |
| 2004/0059712 A1 | 3/2004 | Dean et al. | 707/1 |
| 2005/0027664 A1 | 2/2005 | Johnson et al. | 706/12 |
| 2005/0234891 A1 | 10/2005 | Walther et al. | 707/3 |
| 2005/0256866 A1 | 11/2005 | Lu et al. | 707/5 |
| 2006/0031340 A1 | 2/2006 | Mathew et al. | 709/206 |
| 2007/0055926 A1 | 3/2007 | Christiansen et al. | 715/512 |

FOREIGN PATENT DOCUMENTS

| | | | |
|---|---|---|---|
| WO | WO 03/107127 A2 | 12/2003 | |

OTHER PUBLICATIONS

Cho, Junghoo, et al., "Efficient Crawling Through URL Ordering," *Proceedings of the 7th Int'l World Wide Web Conf.*, Apr. 14-18, 1998, Brisbane, Australia.

Haveliwala, Taher, "Topic-Sensitive PageRank," *Proceedings of the 11th Int'l World Wide Web Conf.*, Honolulu, Hawaii, May 2002.

Jeh, Glen, et al., "Scaling Personalized Web Search," *Stanford University Technical Report*, 2002.

Pretschner, Alexander, et al., "Ontology Based Personalized Search," *Proceedings of 11th IEEE Int'l Conf. on Tools with Artificial Intelligence*, Chicago, Illinois, Nov. 1999.

Speretta, M., et al., "Personalizing Search Based on User Search Histories," 13th Int'l Conf. on Information and Knowledge Management, Nov. 18-13, 2004, Washington, DC, 2004.

Press release, "FirstStop WebSearch Becomes First Meta-Search Tool in Emerging Field of 'Social Bookmarks'", www.new.findlaw.com, May 31, 2005.

Gislason, H., et al. "PassingNotes.com Interview," http://www.passingnotes.com/wp-print.php?p=127, Jul. 23, 2004.

Hammond, T., et al., "Social Bookmarking Tools (I)," D-Lib Magazine, Apr. 2005.

"New Search Tools for Del.icio.us," http://pchere.blogspot.com/2005/03/new-search-tools-fordelicious.html, Mar. 21, 2005.

KeyNet Consultancy, "Move Over Memigo—You have Competition," http://keynet.blogs.com/networks/2004/02/move_over_memig.html, Feb. 19, 2004.

www.furl.net, index, FAQs, uses, and commitment, 2005.

"Social bookmarks' charts ver. 2.2d," www.irox.de, Jun. 3, 2005.

"Eurekster Search Party—platform, how eurekster works, FAQs, toolbars," www.eurekster.com, 2004.

Sullivan, D., "Eurekster Launches Personalized Social Search," http://searchenginewatch.com/searchday/print.php/34711_3301481, Jan. 21, 2004.

Sherman, C., "Friendster, Eurekster Team Up for Personalized Search," http://searchenginewatch.com/searchday/print.php/34711_3445791, Dec. 9, 2004.

Palme, J., "Choices in the Implementation of Rating," http://cmc.dsv.su.se/select/rating-choices.html, Jul. 25, 1998.

Palme, J., Filtering and Collaborative Filtering, DELOS Workshop, Budapest, Hungry, Nov. 1997, http://dsv/su.se/jpalme/select/delos-filtering-notes-nov97.htm.

Palme, J., "Who controlled distribution of information before the Internet?" http://dsv/su/se/jpalme/select/filtering-ohs.pdf, Nov. 1997.

Main page, www.yep.com.

Battelle, J., "Grokking Furl: Storage, Search, and the PersonalWeb," http://battellemedia.com/archives/000591.php, Apr. 19, 2004.

Gahran, A., "10 Cool Things to Do with Furl," http://blog.contentious.com/archives/2004/06/22/10-cool-things-to-dowith-furl, Apr. 20, 2005.

Gahran, A., "Furl and Del.icio.us: Almost Perfect Together," http://blg/contentious.com/archives/2005/04/20/furl-delicious-almost-perfect-together, Apr. 20, 2005.

Main page and FAQs, www.spurl.net, 2004.

Patterson, B., "A9: CNET Editor's Review," http://64.233.167.104/search?q=cache:OFUYX-BZXYQJ:computershopper.com.com/A9/4..., May 9, 2005.

Saunders, C., "A9.com: Merging Search, User Data, E-commerce," http://64.233.167.104/search?q=cache:-d DxL3EJPVAJ:www.ecommerce-guide.com/new/..., Apr. 19, 2004.

"An Extreme Searcher Guide . . . Yahoo! to the Max," *see*, "Yahoo! Introduces Personal Search," http://extremesearcher.com/yahoo.html, Apr. 27, 2005.

Net Perceptions, "White Paper—Building Customer Loyalty and Profitable 1-to-1 Customer Relationships with Net Perception's GroupLens Recommendation Engine," http://web/archive.org/web/19771210171213/http://www.netperceptions.com/product_white.., 1997.

Resnick, P., et al., "GroupLens: An Open Architecture for Collaborative Filtering of Netnews," *Proceedings of ACM 1994 Conf. on Computer Supported Cooperative Work*, Chapel Hill, NC, 1994, pp. 175-186.

Office Action from U.S. Appl. No. 11/228,948 dated Nov. 19, 2007.
Amendment from U.S. Appl. No. 11/228,948 dated Feb. 19, 2008.
Final Office Action from U.S. Appl. No. 11/228,948 dated May 28, 2008.
Response to Final Office Action from U.S. Appl. No. 11/228,948 dated Jul. 22, 2008.
Office Action from U.S. Appl. No. 11/228,948 dated Sep. 10, 2008.
Amendment from U.S. Appl. No. 11/228,948 dated Dec. 10, 2008.
Final Office Action from U.S. Appl. No. 11/228,948 dated Feb. 27, 2009.
Response to Final Office Action from U.S. Appl. No. 11/228,948 dated Apr. 27, 2009.
Advisory Action from U.S. Appl. No. 11/228,948 dated May 11, 2009.
Appelant's Brief from U.S. Appl. No. 11/228,948 dated Jul. 27, 2009.
Response to Non-Compliant Appeal Brief from U.S. Appl. No. 11/228,948 dated Nov. 13, 2009.
Response to Non-Compliant Appeal Brief from U.S. Appl. No. 11/228,948 dated Feb. 19, 2010.
Office Action from U.S. Appl. No. 11/229,124 dated Dec. 26, 2007.
Amendment from U.S. Appl. No. 11/229,124 dated Mar. 24, 2008.
Final Office Action from U.S. Appl. No. 11/229,124 dated Jun. 17, 2008.
Response to Final Office Action from U.S. Appl. No. 11/229,124 dated Aug. 18, 2008.
Advisory Action from U.S. Appl. No. 11/229,124 dated Sep. 8, 2008.
Office Action from U.S. Appl. No. 11/229,124 dated Nov. 5, 2008.
Response to Office Action from U.S. Appl. No. 11/229,124 dated Feb. 5, 2009.
Office Action from U.S. Appl. No. 11/229,124 dated May 26, 2009.
Response to Office Action from U.S. Appl. No. 11/229,124 dated Aug. 26, 2009.
Final Office Action from U.S. Appl. No. 11/229,124 dated Dec. 30, 2009.
Response to Final Office Action from U.S. Appl. No. 11/229,124 dated Mar. 1, 2010.

A9.com—A9 Toolbar, printed on May 31, 2005, 1 pg., http://toolbar.a9.com/.
A9 Toolbar Help, printed on Jun. 6, 2005, 12 pgs., http://toolbar.a9.com/help.jsp.
"About," printed on Sep. 15, 2005, 4 pgs., http://del.icio.us/us/doc/about.
Palme, J., "SELECT EU Project Status," Oct. 4, 1999, 10 pgs., http://www.dsv.su.se/jpalme.
Rate the Quality of Web Pages, printed on Jun. 9, 2005, 4 pgs., http://cmc.dsv.su.se/select/.
Select Project Index, printed on Jun. 9, 2005, 2 pgs., http://cmc.dsv.su.se/select/select-overview.html.
"SELECT server at SZTAKI," printed on Jun. 9, 2005, 12 pgs., http://www.sztaki.hu/SELECT/.
"StumbleUpon Reviews," printed on Jun. 6, 2005, 7 pgs., http://www.stumbleupon.com.
"Technorati: Favelets," printed on Jun. 6, 2005, 3 pgs., http://www.technorati.com/members/favelets.html.
Yep Main Page, printed on Jun. 9, 2005, 1 pg., http://www.yep.com.

\* cited by examiner

| | Event-Based Data | Derived Data | User-Specified Data | | | | | | |
|---|---|---|---|---|---|---|---|---|---|
| | ↑702 | ↑704 | ↑706 | | | | | | ↑708 |
| | | | URL 710-1 | docID 712-1 | Rating 714-1 | Label(s) 716-1 | Comment 718-1 | Title 720-1 | Privacy 722-1 |
| | | | URL 710-2 | docID 712-2 | Rating 714-2 | Label(s) 716-2 | Comment 718-2 | Title 720-2 | Privacy 722-2 |
| User Identifier | | | URL 710-3 | docID 712-3 | Rating 714-3 | Label(s) 716-3 | Comment 718-3 | Title 720-3 | Privacy 722-3 |
| | | | . . . | | | . . . | | | |
| | | | URL 710-N | docID 712-N | Rating 714-N | Label(s) 716-N | Comment 718-N | Title 720-N | Privacy 722-N |

User Record 700 in User Information Database 116

Figure 7A

| URL 710 and/or docID 712 | Pointers to user records 752 | Aggregate information 754 |
|---|---|---|
| | | Histogram data 756 |
| | | Aggregate rating score 758 |
| | | Number of ratings 760 |
| | | . . . |

Community Record 750 in User Information Database 116

Figure 7B

METHOD, SYSTEM, AND GRAPHICAL USER INTERFACE FOR IMPROVED SEARCHING VIA USER-SPECIFIED ANNOTATIONS

RELATED APPLICATIONS

This application is a continuation-in-part of U.S. patent application Ser. No. 11/097,884, filed Mar. 31, 2005, entitled "Systems and Methods for Providing Subscription-Based Personalization," which application is incorporated by reference herein in its entirety.

TECHNICAL FIELD

The disclosed embodiments relate generally to search engines. More particularly, the disclosed embodiments relate to methods, systems, and user interfaces for improved web searching via user-specified annotations for web documents (e.g., user-specified ratings, labels, and/or comments for web pages).

BACKGROUND

Search engines typically provide a source of indexed documents from the Internet (or an intranet) that can be rapidly scanned in response to a search query submitted by a user. As the number of documents accessible via the Internet grows, the number of documents that match a particular query may also increase. However, not every document matching the query is likely to be equally important from a user's perspective. A user may be overwhelmed by an enormous number of documents returned by a search engine, unless the documents are ordered based on their relevance to the user's query. One way to order documents is the PageRank algorithm more fully described in the article "The Anatomy of a Large-Scale Hypertextual Search Engine" by S. Brin and L. Page, 7$^{th}$ International World Wide Web Conference, Brisbane, Australia and U.S. Pat. No. 6,285,999, both of which are hereby incorporated by reference as background information.

A given user spends considerable time evaluating his or her search results. These evaluations identify web pages for the user that are either very useful, completely useless, or somewhere in between. If the user performs the same or similar searches at a later time, the user will typically have to start the search result evaluation process from scratch because the user will have forgotten most, if not all, of the prior analyses. Thus, most or all of the prior analyses are lost.

Several techniques and services have been developed to help a user search more efficiently and retrieve web documents of interest faster, with limited success. A user can simply bookmark web pages that the user finds valuable. Social bookmarking services (e.g., furl.net, spurl.net, hyperlinkomatic.com, simpy.com, gibeo.net, del.icio.us, citeulike.org, connotea.org, linkroll.com, openbm.de, feedmelinks.com, unalog.com, igooi.com, and blogmarks.net) permit a user to save his or her bookmarks to a public web site and tag them with keywords, comments, and/or ratings. A9.com permits a user to save bookmarks and the corresponding web pages on a central server. Yahoo!'s My Web permits a user to save a web page, add notes to the page, choose a folder to store the page in, and exclude certain web pages from future searches. Eurekster.com reorders web search results based on web pages viewed by a user's social network.

These various services, however, do not improve a user's subsequent web searches as much as they could because they do not take full advantage of the user's analyses of prior search results (or fail to use these analyses at all).

For example, most of the bookmark-related services do not integrate the bookmarks with subsequent web searches. Users must do separate searches for old and new content (i.e., separate searches of old bookmarked pages and the world wide web). A few bookmark-related services (e.g., furl.net) permit a single search query to search both the user's bookmarked pages and the web, but the search results are not integrated: the search results from the user's bookmarked pages are listed separately from the web search results.

Eurekster.com assumes that a web page is useful based on the time spent viewing the page by the user and/or by a member of the user's social network, rather than using the user's explicit analyses. For example, Eurekster.com infers that a web page is useful if the page is viewed for more than a predefined amount of time, such as one minute.

Thus, it would be desirable to develop methods, systems and user interfaces that help a user search more efficiently using the user's analyses of prior search results.

SUMMARY

One aspect of the invention involves a computer-implemented method in which a search engine receives a search request sent by a computer associated with a user. The search engine identifies a plurality of documents that satisfy the search request. At least some of the plurality of documents have not previously been rated by the user. The search engine identifies at least some documents in the plurality of documents that have previously been rated by the user and sends a response to the search request. The response includes a ranked set of links to at least some of the plurality of documents that satisfy the search request. At least some of the links in the response are to documents that have not previously been rated by the user and at least some of the links are to documents that have previously been rated by the user. The response also includes instructions to display the links in an order that depends at least in part on the ratings of the documents that have previously been rated by the user and that are included in the response.

Another aspect of the invention involves a search engine that includes a main memory, a processor, and a program. The program is stored in the main memory and executed by the processor. The program includes: instructions for receiving a search request sent by a computer associated with a user; instructions for identifying a plurality of documents that satisfy the search request, wherein at least some of the plurality of documents have not previously been rated by the user; instructions for identifying at least some documents in the plurality of documents that have previously been rated by the user; and instructions for sending a response to the search request. The response includes a ranked set of links to at least some of the plurality of documents that satisfy the search request. At least some of the links in the response are to documents that have not previously been rated by the user and at least some of the links are to documents that have previously been rated by the user. The response also includes instructions to display the links in an order that depends at least in part on the ratings of the documents that have previously been rated by the user and that are included in the response.

Another aspect of the invention involves a computer-program product that includes a computer readable storage medium and a computer program mechanism embedded therein. The computer program mechanism includes: instructions for receiving a search request sent by a computer associated with a user; instructions for identifying a plurality of documents that satisfy the search request, wherein at least some of the plurality of documents have not previously been rated by the user; instructions for identifying at least some documents in the plurality of documents that have previously been rated by the user; and instructions for sending a response to the search request. The response includes a ranked set of links to at least some of the plurality of documents that satisfy the search request. At least some of the links in the response are to documents that have not previously been rated by the user and at least some of the links are to documents that have previously been rated by the user. The response also includes instructions to display the links in an order that depends at least in part on the ratings of the documents that have previously been rated by the user and that are included in the response.

Another aspect of the invention involves a computer-implemented method in which a client computer associated with a user sends a search request. The client computer receives a response to the search request that includes a ranked set of links to at least some of the plurality of documents that satisfy the search request. At least some of the links in the response are to documents that have not previously been rated by the user and at least some of the links are to documents that have previously been rated by the user. The client computer displays at least some of the ranked set of links. The links are displayed in an order that depends at least in part on the ratings of the documents that have previously been rated by the user and that are included in the response.

Another aspect of the invention involves a client computer that includes a main memory, a processor, and a program. The program is stored in the main memory and executed by the processor. The program includes: instructions for sending a search request; instructions for receiving a response to the search request that includes a ranked set of links to at least some of the plurality of documents that satisfy the search request, wherein at least some of the links in the response are to documents that have not previously been rated by the user and at least some of the links are to documents that have previously been rated by the user; and instructions for displaying at least some of the ranked set of links. The links are displayed in an order that depends at least in part on the ratings of the documents that have previously been rated by the user and that are included in the response.

Another aspect of the invention involves a computer-program product that includes a computer readable storage medium and a computer program mechanism embedded therein. The computer program mechanism includes: instructions for sending a search request; instructions for receiving a response to the search request that includes a ranked set of links to at least some of the plurality of documents that satisfy the search request, wherein at least some of the links in the response are to documents that have not previously been rated by the user and at least some of the links are to documents that have previously been rated by the user; and instructions for displaying at least some of the ranked set of links. The links are displayed in an order that depends at least in part on the ratings of the documents that have previously been rated by the user and that are included in the response.

Another aspect of the invention involves a graphical user interface on a computer that includes a ranked set of links responsive to a search request. At least some of the links are to documents that have not previously been rated by the user and at least some of the links are to documents that have previously been rated by the user. The links are displayed in an order that depends at least in part on the ratings of the documents that have previously been rated by the user.

Thus, with the present invention, a user's prior analyses of search results are seamlessly integrated with subsequent searches to make the subsequent searches more efficient (e.g., by integrating user-specified annotations of web pages into subsequent search results and/or by using user-specified annotations to change the order of results in subsequent searches).

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 7A is an exemplary user record in the user information database in accordance with one embodiment of the invention.

FIG. 7B is an exemplary community record in the user information database in accordance with one embodiment of the invention

DESCRIPTION OF EMBODIMENTS

Methods, systems, and user interfaces for improved web searching via user-specified annotations of web documents are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Figure 1:
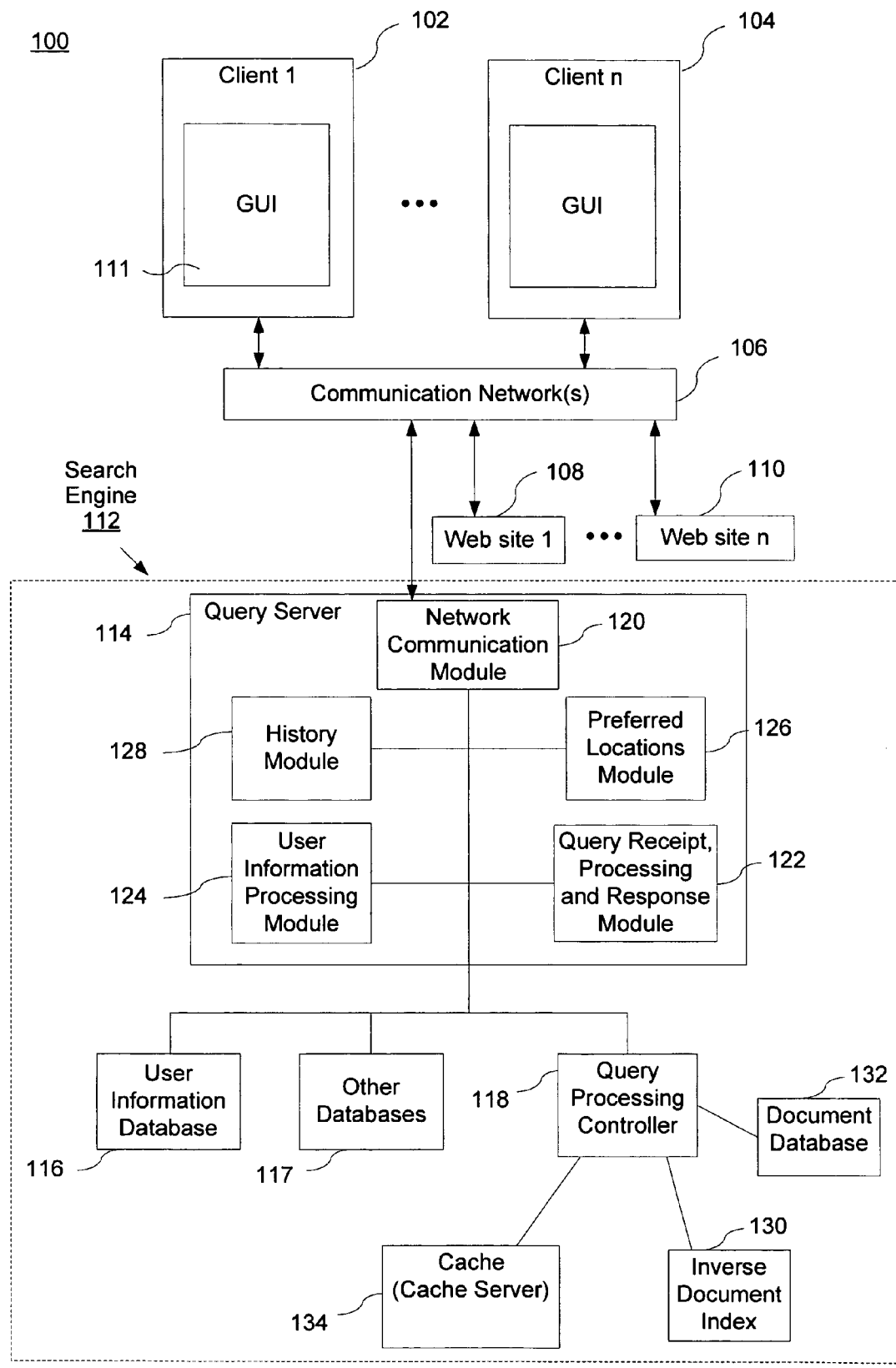
FIG. 1 is a block diagram illustrating an exemplary distributed computer system according to one embodiment of the invention.

FIG. 1 is a block diagram illustrating an exemplary distributed computer system 100 according to one embodiment of the invention. FIG. 1 shows various functional components that will be referred to in the detailed discussion that follows. The system 100 may include one or more clients 102-104. Client 102 can be any of a number of devices (e.g., computer, interne kiosk, personal digital assistant, cell phone, gaming device, desktop computer, or laptop computer) used to enable the activities described below. Client 102 includes graphical user interface (GUI) 111. Clients 102-104 are connected to a communications network 106. The communications network 106 connects the clients 102-104 to a search engine system 112. Search engine 112 includes a query server 114 connected to the communications network 106, a user information database 116, a query processing controller 118, and optionally other databases 117.

Search engine 112 generates search results in response to search queries from one or more clients 102-104. It should be appreciated that the layout of the search engine system 112 is merely exemplary and may take on any other suitable layout or configuration. The search engine system 112 is used to search an index of documents, such as billions of web pages or other documents indexed by modern search engines.

Note that the search engine system 112 can be used as an Internet search engine, for locating documents on the WWW and/or as an intranet search engine, for locating documents stored on servers or other hosts within an intranet. In addition, the methodology described herein is applicable to implementations where only portions of documents, such as titles and abstracts, are stored in a database (e.g., 132) of the search engine system 112.

The search engine system 112 may include multiple data centers, each housing a backend. The data centers are generally widely dispersed from one another, such as across the continental United States. Search queries submitted by users at one of the clients 102 to the search engine system 112 are routed to an appropriate backend as part of the Domain Name System (DNS), based on current load, geographic locality and/or whether that data center is operating.

Each backend preferably includes multiple query servers, such as query server 114, coupled to a communications network 106 via a network communication module 120. The communications network 106 may be the Internet, but may also be any local area network (LAN) and/or wide area network (WAN). In some embodiments, each query server 114 is a Web server that receives search query requests and delivers search results in the form of web pages via HTTP, XML or similar protocols. Alternatively, if the query server 114 is used within an intranet, it may be an intranet server. In essence, the query servers, such as query server 114, are configured to control the search process, including searching a document index, analyzing and formatting the search results.

The query server 114 typically includes a network communications module 120, a query receipt, processing and response module 122, a user information processing module 124, a preferred locations module 126 and a history module 128, all interconnected. The network communications module 120 connects the query server 114 to the communication network 106 and enables the receipt of communications from the communication network 106 and the provision of communications to the communication network 106 bound for the client 102 or other destinations. The query receipt, processing and response module 122 is primarily responsible for receiving search queries, processing them and returning responses to the client 102 via the network communications module 120. The preferred locations module 126 assists in determining a set of preferred locations (e.g., URLs (Uniform Resource Locators), documents on a network, and/or web sites) for a user which may, in some embodiments, be based on combining the user's preferred locations with the preferred locations from one or more users or groups. The history module 128 assists in allowing a user to search and/or browse the user's prior activities and can provide the results of the search or browse alone or in combination with other results from a more generalized search. In some embodiments, the history module 128 is used to adjust the order of search results based on the user's history (e.g., search and browsing history). The user information processing module 124 assists in accessing, updating and modifying the user information database 116. The user information database 116 stores various information about the user's activities in a user record (described below). In addition, the user information database 116 may store derived information about the user based on the user's activities. The other databases 117 optionally include other databases with which the various modules in query server 114 may interact, such as a message database (electronic or otherwise), and user-created document databases (e.g., documents created from word processing programs, spreadsheet programs, or other various applications).

The query processing controller 118 is connected to an inverse document index 130, a document database 132 and a query cache 134. The cache 134 is used to temporarily store search results. The inverse document index 130 and document database 132 are sometimes collectively called the document database. In some embodiments, "searching the document database" means searching the inverse document index 130 to identify documents matching a specified search query or term.

Search rank values for the documents in the search results are conveyed to the query processing controller 118 and/or the query server 114, and are used to construct an ordered search result list. Once the query processing controller 118 constructs the ordered search result list, the query processing controller 118 may transmit to the document database 132 a request for snippets of an appropriate subset of the documents in the ordered search list. For example, the query processing controller 118 may request snippets for the first fifteen or so of the documents in the ordered search result list. The document database 132 constructs snippets based on the search query, and returns the snippets to the query processing controller 118. The query processing controller 118 then returns a list of located documents with their associated links (i.e., hyperlinks) and snippets back to the query server 114. In some embodiments, the snippets are stored in the cache server 134 along with the ordered search results. As a result, in these embodiments the query processing controller 118 may only request snippets for documents, if any, for which it is unable to obtain valid cached snippets from the cache server 134.

In some embodiments, fewer and/or additional modules, functions or databases are included in the search engine 112. The modules shown in FIG. 1 as being part of search engine 112 represent functions performed in an exemplary embodiment.

Although FIG. 1 portrays discrete blocks, the figure is intended more as a functional description of some embodiments of the invention rather than a structural description of the functional elements. One of ordinary skill in the art will recognize that an actual implementation might have the functional elements grouped or split among various components. For example, the user information database 116 may be part of the query server 114. In some embodiments the user information database 116 may be implemented using one or more servers whose primary function is to store and process user information. Similarly, the document database 132 may be implemented on one or more servers whose primary purpose is to store various documents. Moreover, one or more of the blocks in FIG. 1 may be implemented on one or more servers designed to provide the described functionality. Although the description herein refers to certain features implemented in the client 102 and certain features implemented in the search system 112, the embodiments of the invention are not limited to such distinctions. For example, features described herein as being part of the search system 112 could be implemented in whole or in part in the client 102, and vice versa.

Figure 2:
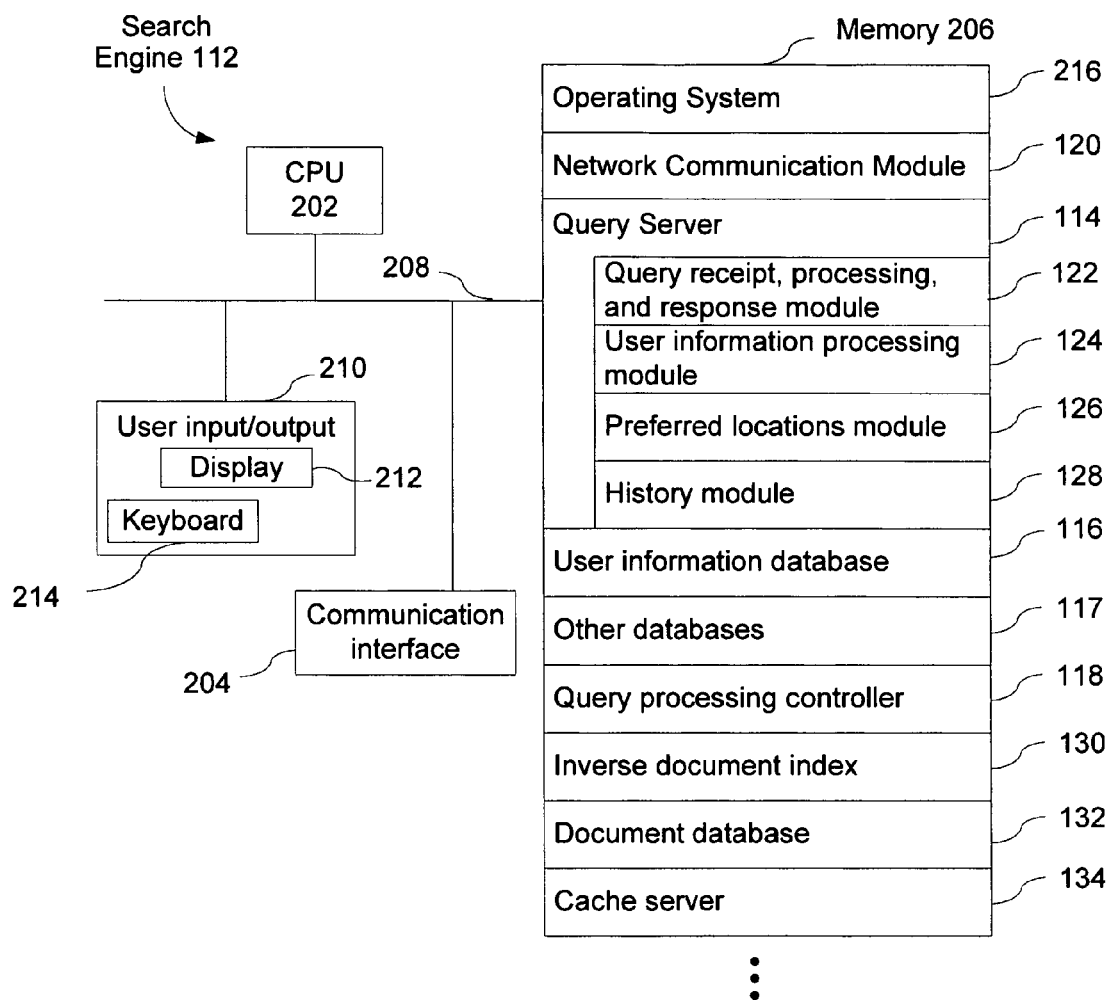
FIG. 2 is a block diagram illustrating search engine 112 in accordance with one embodiment of the present invention.

FIG. 2 is a block diagram illustrating search engine 112 in accordance with one embodiment of the present invention. Search engine 112 typically includes one or more processing units (CPU's) 202, one or more network or other communications interfaces 204, memory 206, and one or more communication buses 208 for interconnecting these components. Search engine 112 optionally may include a user interface 210 comprising a display device 212 and a keyboard 214. Memory 206 may include high speed random access memory and may also include non-volatile memory, such as one or more magnetic disk storage devices. Memory 206 may optionally include one or more storage devices remotely located from the CPU(s) 202. In some embodiments, the memory 206 stores the following programs, modules and data structures, or a subset or superset thereof:

- an operating system 216 that includes procedures for handling various basic system services and for performing hardware dependent tasks;
- a network communication module (or instructions) 218 that is used for connecting search engine 112 to other computers (e.g., clients 102-104 and web sites 108-110) via one or more communication network interfaces 204 (wired or wireless), using the Internet, other wide area networks, local area networks, metropolitan area networks, and so on;
- a query server 114 for responding to and processing communications from the client 102;
- a user information database 116 for storing information about users as described in reference to FIG. 7;
- other databases 117 that the various modules in query server 114 may interact with, such as a message database (electronic or otherwise), and user-created document databases (e.g., documents created from word processing programs, spreadsheet programs, or other various applications);
- a query processing controller 118 for receiving requests from one of the query servers, such as the query server 114, and transmitting the requests to the cache 134, the inverse document index 130 and the document database 132;
- an inverse document index 130 for storing a set of words contained in document database 132 and, for each word, pointers to documents in document database 132 that contain the word;
- a document database 132 for storing documents or portions of documents such as web pages; and
- a cache server 134 for increasing search efficiency by temporarily storing previously located search results.

In some embodiments, the query server 114 includes the following elements, or a subset of such elements: a query receipt, processing and response module 122 for receiving and responding to search queries and managing the processing of search queries by one or more query processing controllers, such as query processing controller 118, that are coupled to the query server 114; a user information and processing module 124 for accessing and modifying the user information database 116, which includes one or more user records 700 (described in more detail in FIG. 7A below); a preferred locations module 126 for determining a set of preferred locations (e.g., URLs, documents on a network, and/or web sites) for a user; and a history module 128 for processing and handling requests for searching a user's history. In some embodiments, the query server 114 and/or the user information database 116 include additional modules.

Figure 3:
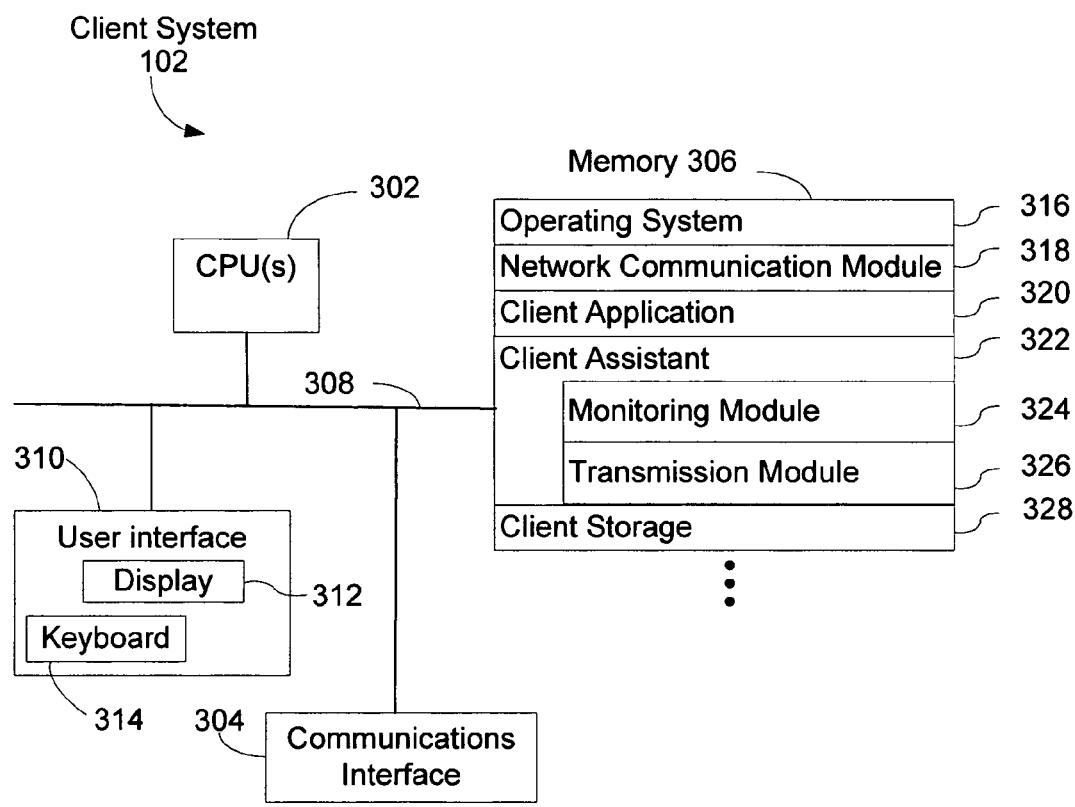
FIG. 3 is a block diagram illustrating client system 102 in accordance with one embodiment of the present invention.

FIG. 3 is a block diagram illustrating client system 102 in accordance with one embodiment of the present invention. Client 102 typically includes one or more processing units (CPUs) 302, one or more network or other communications interfaces 304, memory 306, and one or more communication buses 308 for interconnecting these components. The client system 102 may include a user interface 310, for instance a display 312 and a keyboard 314. The memory 306 may include high speed random access memory and may also include non-volatile memory, such as one or more magnetic or optical storage disks. The memory 306 may include mass storage that is remotely located from CPUs 302. The memory 306 may store the following elements, or a subset or superset of such elements:

- an operating system 316 that includes procedures for handling various basic system services and for performing hardware dependent tasks;
- a network communication module (or instructions) 318 that is used for connecting the client system 102 to other computers via the one or more communications interfaces 304 (wired or wireless), using the Internet, other wide area networks, local area networks, metropolitan area networks, and so on;
- a client application 320 such as a browser;
- a client assistant 322 (e.g., a toolbar, iframe (inline frame), or browser plug-in), which includes a monitoring module 324 for monitoring the activities of a user, and a transmission module 326 for transmitting information about the user's activities to and receiving information from the search system 112; and
- client storage 328 for storing data and documents, including web pages with search results received in response to a search query.

Each of the above identified modules and applications in FIGS. 2-3 correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memories 206 and 306 may store a subset of the modules and data structures identified above. Furthermore, memories 206 and 306 may store additional modules and data structures not described above.

Although FIGS. 2-3 show search engine 112 and client 102 as a number of discrete items, FIGS. 2-3 are intended more as a functional description of the various features which may be present in search engine 112 and client 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in search engine 112 and how features are allocated among them will vary from one implementation to another, and may depend in part on the amount of data traffic that the system must handle during peak usage periods as well as during average usage periods.

Creating and Storing User-Specified Annotations

Figure 4:
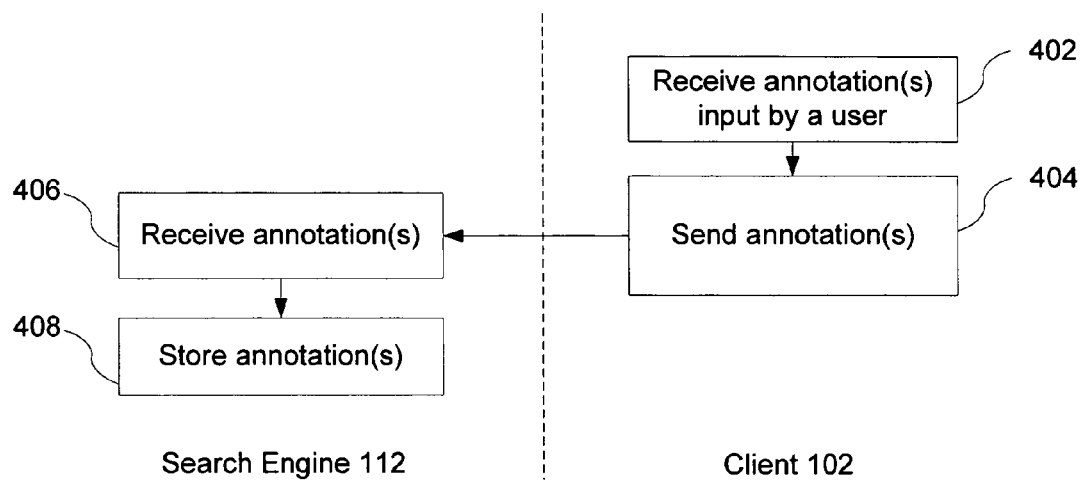
FIG. 4 is a flowchart representing a method of creating and storing user-specified annotations in accordance with one embodiment of the invention.

FIG. 4 is a flowchart representing a method of creating and storing user-specified annotations in accordance with one embodiment of the invention. It will be appreciated by those of ordinary skill in the art that one or more of the acts described may be performed by hardware, software, or a combination thereof, as may be embodied in one or more computing systems.

Prior to receiving user-specified annotations, client 102 receives login information for a user, such as a username and password, and sends the information to search engine 112 via communications network 106. Search engine 112 receives and verifies the login information, thereby enabling search engine 112 to associate subsequent data received from client 102 (e.g., user-specified annotations) with a particular user record 700 in user information database 116.

Client 102 receives (402) annotations for a document (e.g., a web page) from a user. Various methods and user interfaces can be used to receive the user-specified annotations.

Client 102 sends (404) the annotations for the document to search engine 112 via communications network 106. Search engine 112 receives (406) and stores (408) the annotations in user record 700 in user information database 116.

Figure 5:
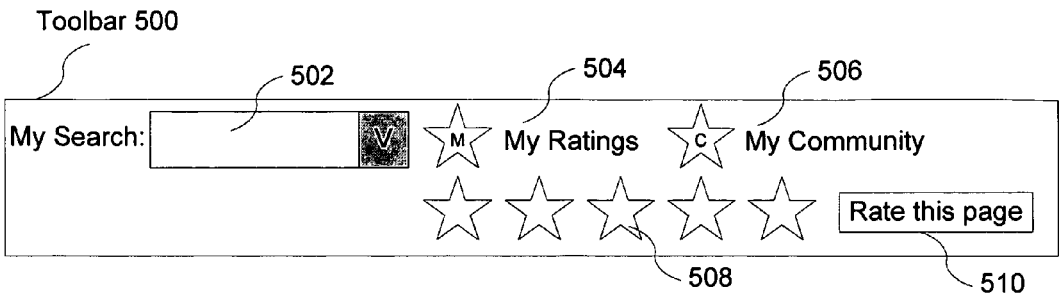
FIG. 5 depicts an exemplary toolbar for a browser for inputting user-specified annotations in accordance with one embodiment of the invention.
Figure 10:
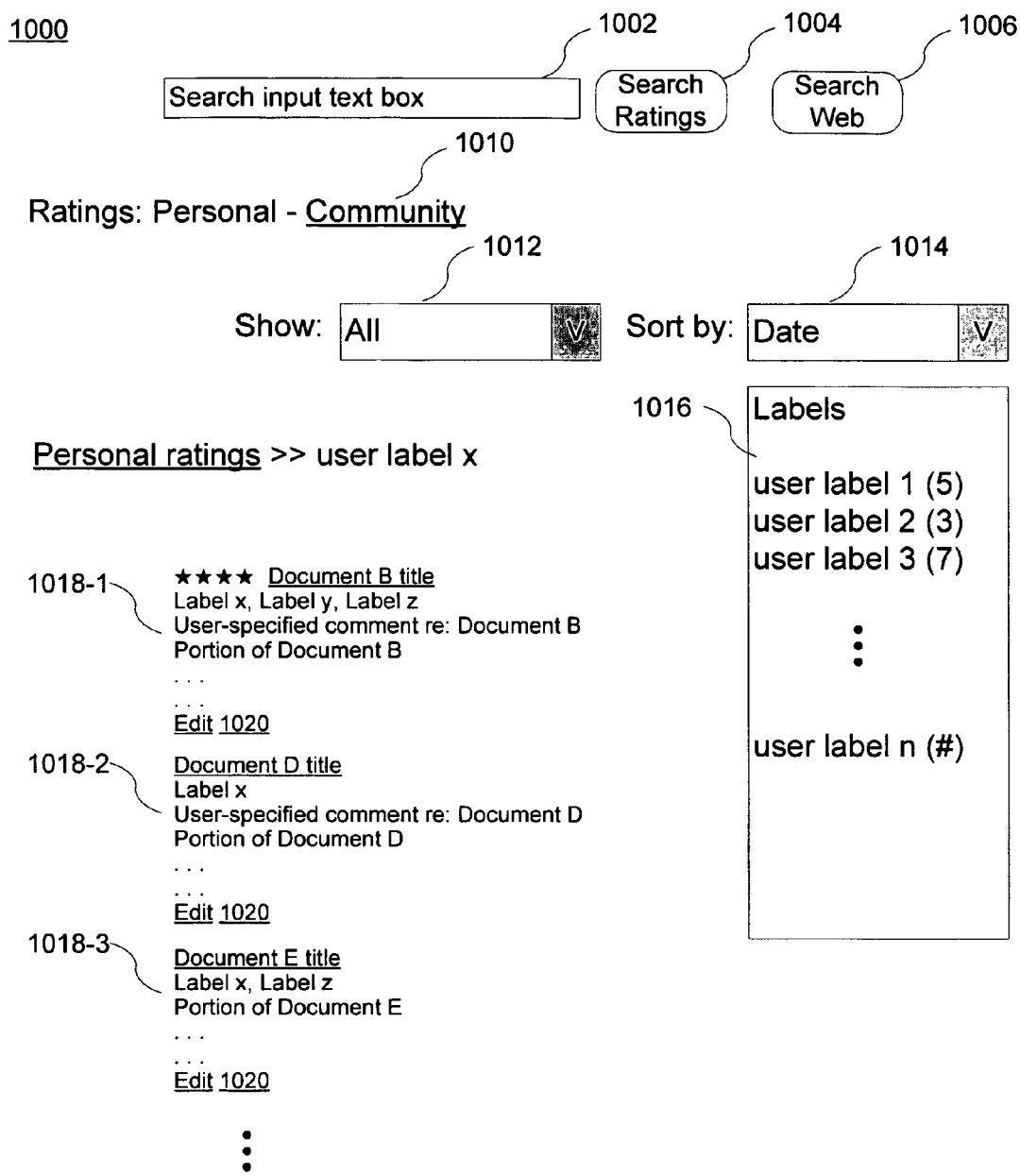
FIG. 10 depicts an exemplary graphical user interface 900 that permits a user to organize and search documents previously annotated by the user in accordance with one embodiment of the invention.
Figure 11A:
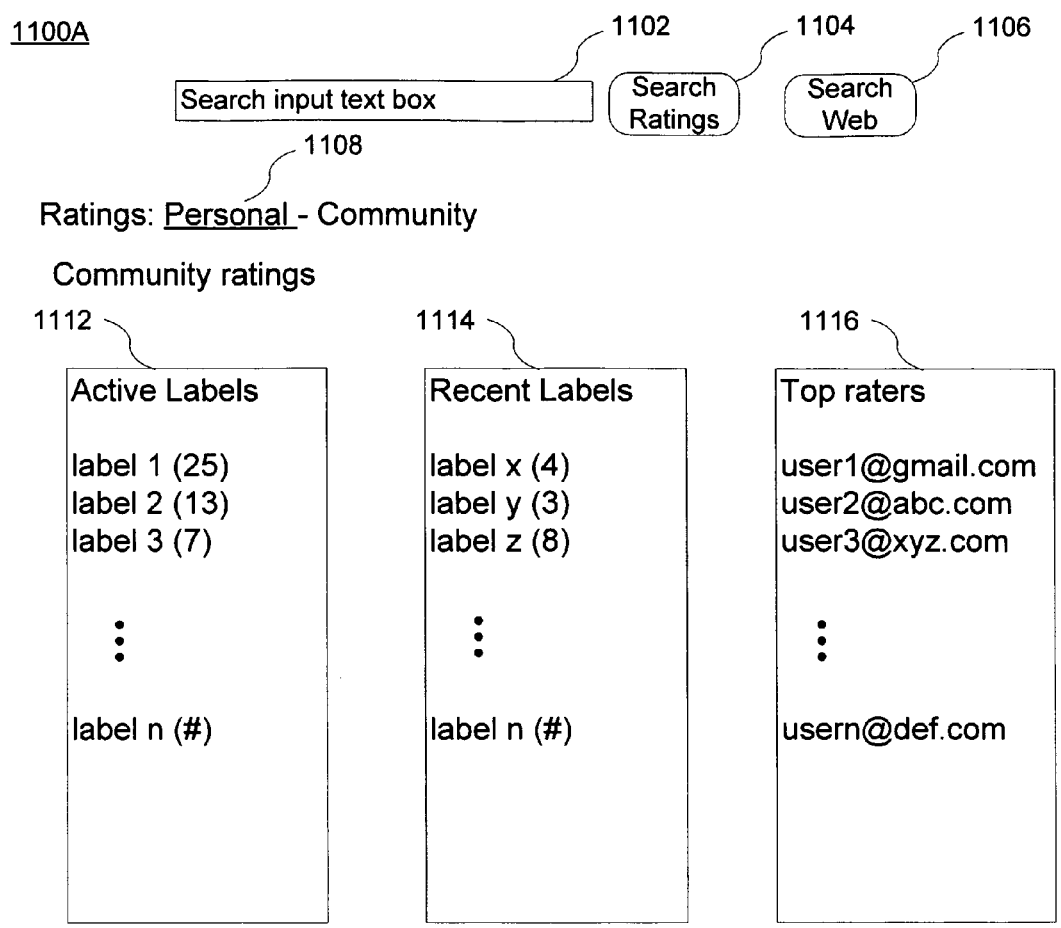
FIGS. 11A and 11B depict exemplary graphical user interfaces 1100A & 1100B that permit a user to organize and search documents previously annotated by a plurality of users in accordance with one embodiment of the invention.
Figure 11B:
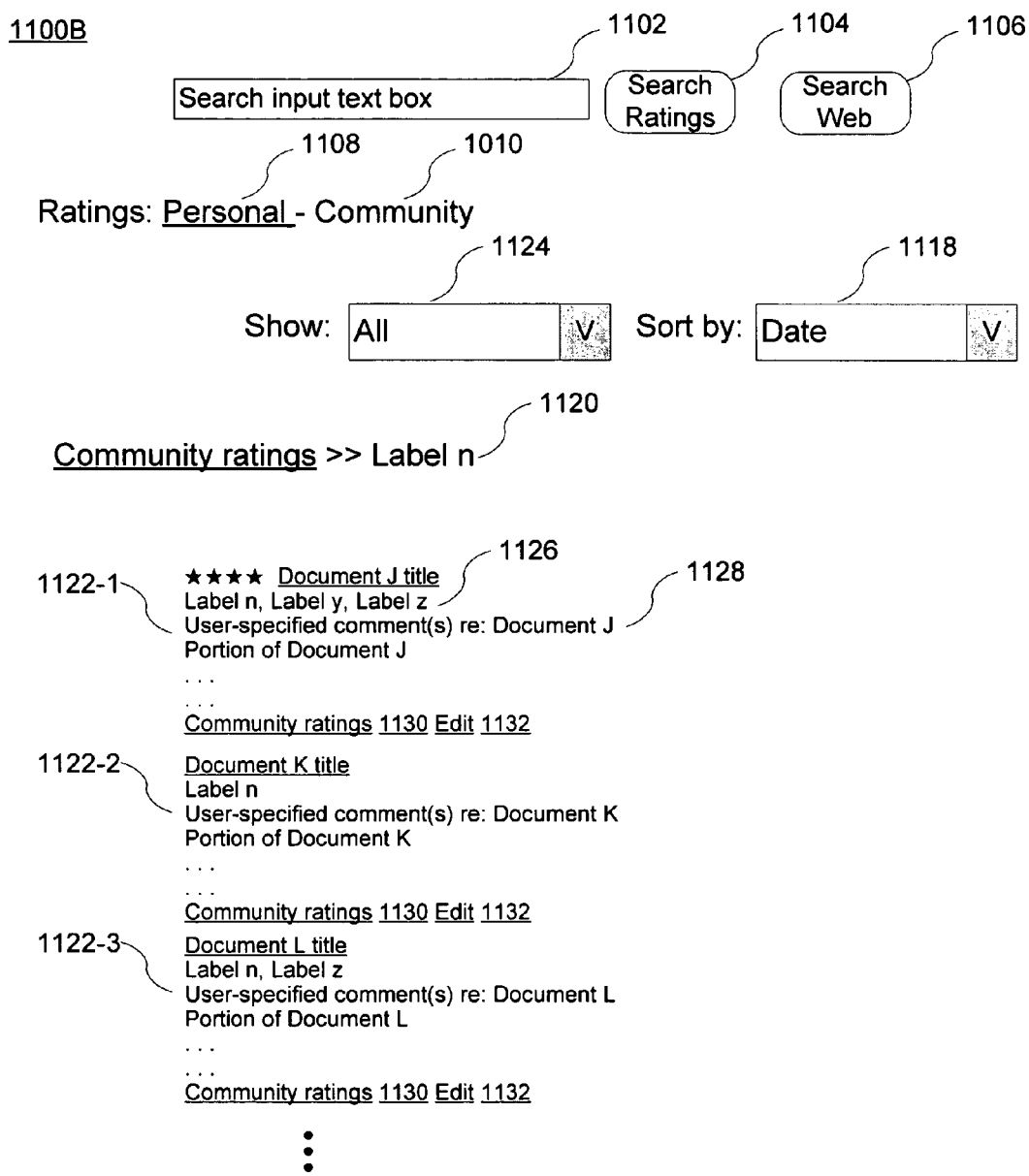

FIG. 5 depicts an exemplary toolbar (one type of client assistant 322) for a browser (one type of client application 320) for inputting user-specified annotations in accordance with one embodiment of the invention. In some embodiments, client 102 receives a rating annotation for a web page when the user clicks on one of the rating icons 508. A user ratings GUI, discussed below with reference to FIG. 10, is accessed by clicking on user ratings icon 504 in toolbar 500. A community ratings GUI, discussed below with reference to FIGS. 11A and 11B, is accessed by clicking on community ratings icon 506 in toolbar 500. A user annotation GUI, discussed below with reference to FIG. 6, is accessed by clicking on the "rate this page" icon 510 in toolbar 500.

Figure 6:
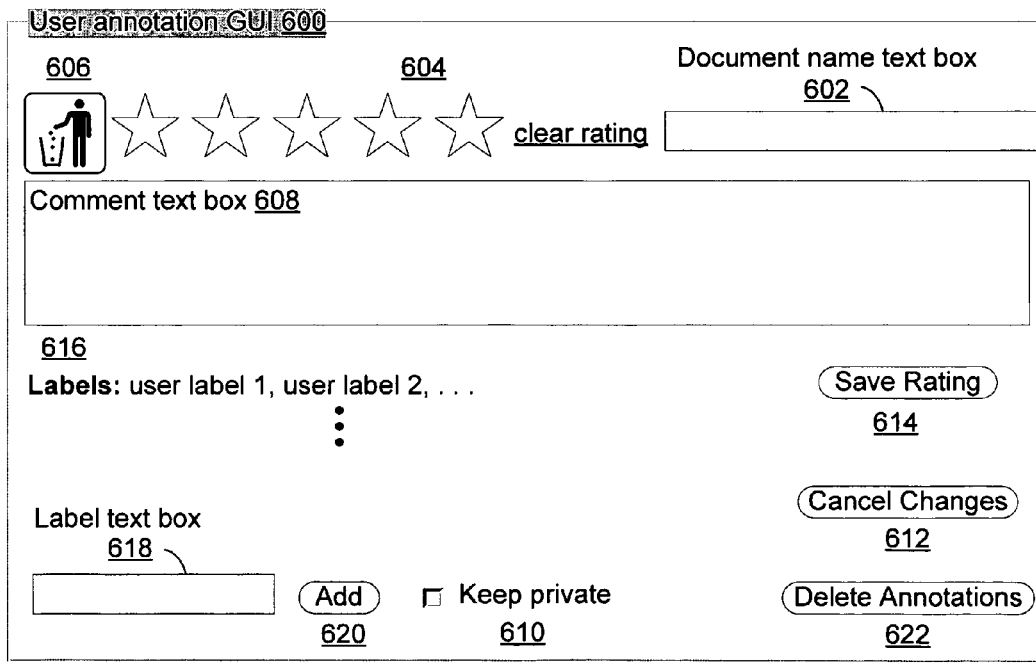
FIG. 6 depicts an exemplary graphical user interface for inputting user-specified annotations in accordance with one embodiment of the invention.

FIG. 6 depicts an exemplary graphical user interface 600 for inputting user-specified annotations in accordance with one embodiment of the invention. In some embodiments, user-annotation GUI 600 contains a subset or a superset of the elements depicted in FIG. 6. In some embodiments, user-annotation GUI 600 is displayed by client 102 in response to the user clicking on a "rate this page" button or icon 510 in toolbar 500, or by clicking on an edit icon in a search results web page, as discussed below with reference to FIGS. 10 and 11A-11B. In some embodiments, user-annotation GUI 600 may appear above the document being annotated, within the document (e.g., as an inline frame), or as a separate window.

In some embodiments, user-annotation GUI 600 contains the following elements, or a subset or superset thereof:

a document name text box 602 that contains a user-editable name for the document;

ratings icons 604, for inputting and clearing the user's rating of the document;

a trash or spam icon 606, for marking a document that the user does not want to see in subsequent search results;

a comment text box 608, for entering user comments about the document;

a privacy checkbox 610, for specifying that the user's annotations for the document are not to be shared, shown, or otherwise used by other users;

a cancel button 612, for canceling input of the annotations and closing user-annotation GUI 600;

a save button 614, for saving the user's annotations and closing user-annotation GUI 600;

labels 616, which comprises a list of one or more user-specified labels associated with the document;

a label text box 618 and "Add" button 620, for adding a new user-specified label to the list of labels 616 associated with the document; and a delete annotations button 622, for deleting the user-specified annotations.

In some embodiments, label text box 616 can automatically display suggested labels to the user based on search engine 112's analysis of the corresponding document. For example, the suggested label can come from the document's title, content (e.g., keywords identified in the document by term frequency inverse document frequency (TFIDF) techniques), URL domain, author or labels selected for the same web page by other users (which may be limited to labels selected by at least N (e.g., 4) distinct users to protect the privacy of the users).

FIG. 7A is an exemplary user record 700 in user information database 116 (FIG. 1) in accordance with one embodiment of the invention. In some embodiments, user record 700 contains a subset or a superset of the elements depicted in FIG. 7A. User information database 116 contains a user identifier 702 which associates certain information in user information database 116 to a particular user or user identifier. In some embodiments, user identifier 702 is associated with a particular instance of a client application. In some embodiments, user identifier 702 is associated with a user (e.g., when the user logs in with a username and password).

In some embodiments, user record 700 includes event-based data 704 (e.g., data derived from monitoring a user's queries, click results, ad clicks, and/or browsing), derived data 706 (e.g., data derived in whole or in part from one or more users in a community of users) and user-specified data 708 such as user-specified annotations for documents analyzed and annotated by the user (e.g., documents 1 through N). In some embodiments, the user-specified data for a given document will include the URL or URI (Uniform Resource Identifier) 710 of the document, a document identifier 712 (docID) for the document in document database 132, the rating 714 specified by the user for the document, one or more labels 716 (keywords) specified by the user for the document, comments 718 specified by the user for the document; a user-editable title 720; and a privacy flag 722 to make the user's annotations for the document unavailable to other users. In some embodiments, docID 712 is not part of user record 700, in which case the URL or URI 710 identifies the document to which the user-specified annotations apply. Either the docID 712 or the URL/URI 710 may be used by search engine 112 to associate the user-specified annotations with a document in document database 132. In some embodiments (not shown in FIG. 7A), user record 700 includes the date(s)/time(s) that rating 714, label 716, and/or comment 718 were added to record 700.

In some embodiments, the user information database 116 is indexed not only by user identifier, but also by docID 712 or URL/URI 710, so as to facilitate the accumulation of annotations and ratings for a particular web page, or group of web pages, from one or more communities of users. In some embodiments, a community record analogous to user record 700 is used to accumulate annotations and ratings for a particular web page, or group of web pages, from one or more communities of users.

FIG. 7B is an exemplary community record 750 in user information database 116 (FIG. 1) in accordance with one embodiment of the invention. In a community record, the primary key is the URL 710 or the docID 712, rather than the user identifier 702. In some embodiments, the community record also contains either copies of user records 700 concerning the particular URL 710 or docID 712 or pointers 752 to such user records 700. In some embodiments, the community record contains aggregate information 754 for the particular URL 710 or docID 712, such as a histogram of rating scores 756; a mean, median, weighted average, or other aggregate rating score 758; and/or the number of raters/ratings 760.

In some embodiments, user-specified data 708 includes more information about the user that is not necessarily represented in the event-based data 704 or the derived data 706. For example, in some embodiments, the user may annotate one or more of a URL, a web page or a search query with keywords that may be used by the user to provide certain information about the URL, web page, or query. For example, a user might add keywords indicating that a particular URL was helpful or pertained to certain information of interest to the user. In some embodiments, a user's search may be run against the annotations, alone or in combination with other information. An information field may identify the annotation and the information to which it pertains (e.g., an event identifier, a content identifier). In some embodiments, a user may indicate certain topics which may be of interest to the user; such topics may be stored in the information field (e.g., part of a profile). In some embodiments, a user may indicate a user-modified ranking value for a particular content (e.g., query, URL, site, advertisement) in an information field. In some embodiments, a user may indicate in the information field a weighting function to be applied against a set of preferred content from another user, a community of users or of a particular topic of interest to the user. This weighting function can be used to combine the user's set of preferred content with the set of preferred content from another user, a community of users, or a set of content associated with a particular topic which is of interest to the user.

In some embodiments, user annotations (e.g., ratings 714, labels 716, and/or comments 718) are also included in inverse document index 130 so that user annotations are included in the set of information searched during searches of the document database.

Displaying User-Specified Annotations

Figure 8:
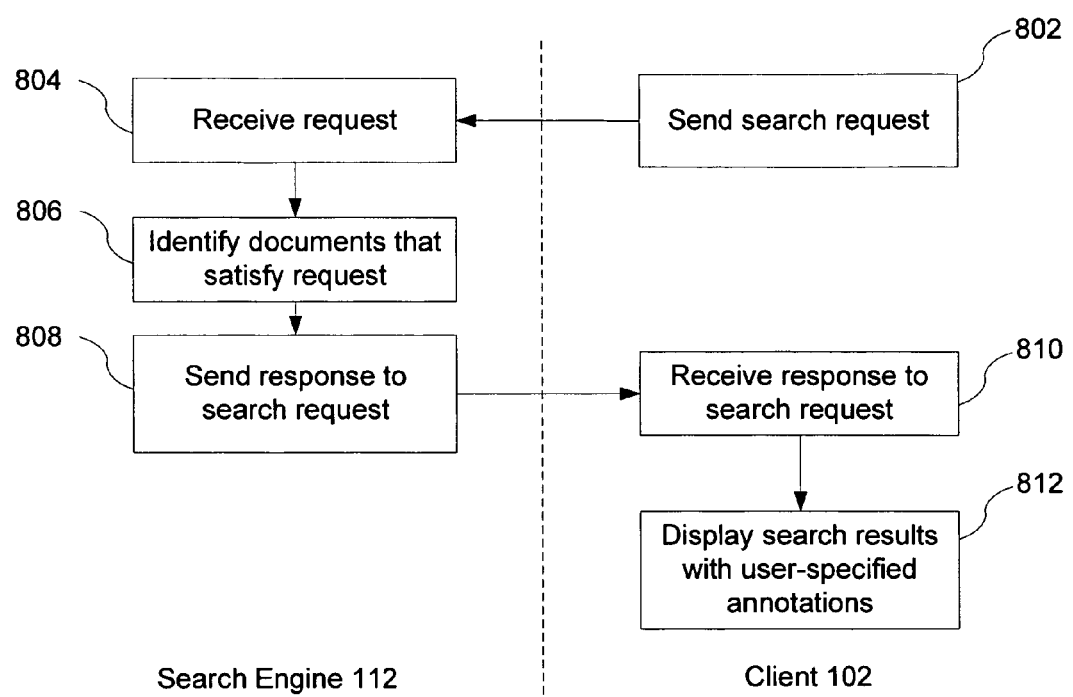
FIG. 8 is a flowchart representing a method of displaying user-specified annotations in accordance with one embodiment of the invention.

FIG. 8 is a flowchart representing a method of displaying user-specified annotations in accordance with one embodiment of the invention. It will be appreciated by those of ordinary skill in the art that one or more of the acts described may be performed by hardware, software, or a combination thereof, as may be embodied in one or more computing systems.

Client 102 sends (802) a search request to search engine 112 via communications network 106. The search request may be input by the user, or may be constructed at the client 102 based on user input. The search engine 112 (e.g., query server 114 in the search engine 112) receives (804) the search request. In some embodiments, the search request is a request to search the Internet. In some embodiments, client 102 is the computer used by the user to enter login information for the search engine 112. In some embodiments, the user has previously registered with the search engine 112.

The search engine 112 (e.g., query processing controller 118 in the search engine 112, FIG. 1) identifies (806) a plurality of documents that satisfy the search request and sends information (e.g., docIDs and/or URLs) identifying at least some of these documents to query receipt, processing, and response module 122 (FIG. 1). Candidate documents for presentation as search results are ordered in accordance with various ranking criteria. In some instances, only the X highest ranked candidates are provided in the response, where X is an integer (e.g., a number between 5 and 50) that is either predefined or chosen based on various system features (e.g., the type of client device, or the size of the display or display region in which the response is to be shown) or user preferences. In some embodiments, at least some of the plurality of documents have not previously been annotated by the user. In some embodiments, at least some of the documents are web pages.

The search engine (e.g., query receipt, processing, and response module 122 in the search engine 112) identifies at least some documents in the plurality of documents that have previously been annotated by the user. In some embodiments, query receipt, processing, and response module 122 performs this identification by determining which docIDs or URLs received from query processing controller 118 are contained in the user's record 700 in user information database 116. In some embodiments, the annotations are ratings 714, labels 716, and/or comments 718 by the user.

The search engine 112 (e.g., query receipt, processing, and response module 122 in the search engine 112) sends (808) a response to the search request. In some embodiments, the response includes a ranked set of links (search results) to at least some of the plurality of documents that satisfy the search request, wherein at least some of the links in the response are to documents that have not previously been annotated by the user and at least some of the links are to documents that have previously been annotated by the user. In some embodiments, the response includes instructions to display one or more corresponding annotations (e.g., ratings 714, labels 716, and/or comments 718 by the user) previously created based on the user's input for at least some of the links to documents that have previously been annotated by the user. In some embodiments, for at least one link to a document that has previously been annotated by the user, the corresponding annotations include a plurality of labels 716.

Client 102 receives (810) the response to the search request and displays (812) at least some of the ranked set of links. Client 102 also displays (812) one or more annotations for at least some of the links to documents that have previously been annotated by the user. In some embodiments, the X highest ranked results are returned to client 102 and displayed as an ordered list, where X is an integer that is either predefined (e.g., a value in the range of 5 to 50) or selected based on user preferences and/or system features. In some embodiments, the results are presented to the user in a number of smaller page units, each page unit containing a subset of the total number of candidates.

Figure 9:
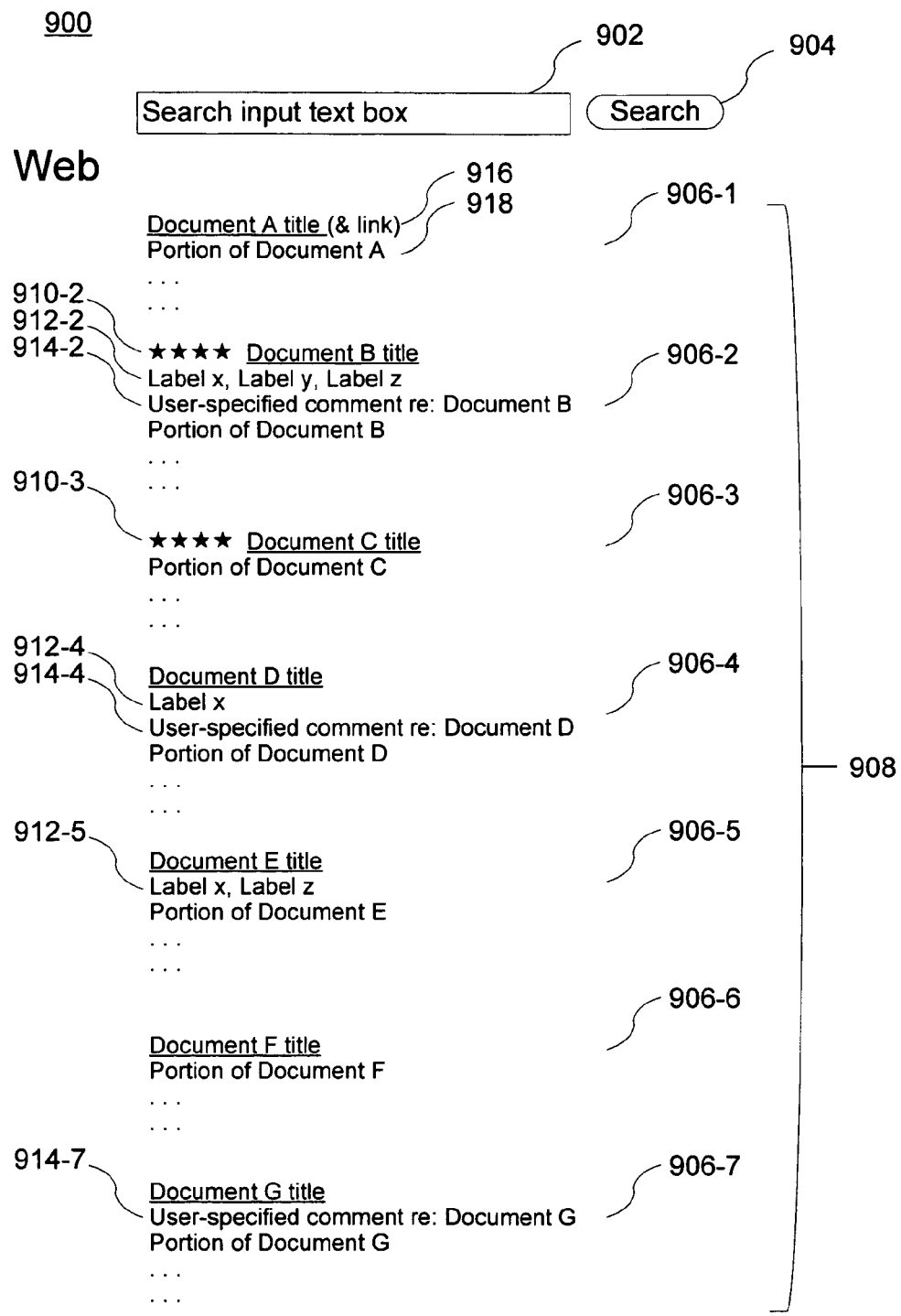
FIG. 9 depicts an exemplary graphical user interface 900 showing search results with user-specified annotations in accordance with one embodiment of the invention.

FIG. 9 depicts an exemplary graphical user interface 900 showing search results with user-specified annotations in accordance with one embodiment of the invention. In some embodiments, GUI 900 includes a search input text box 902, search initiation icon 904, and search results 906, which are displayed as an ordered list 908. In some embodiments, a search result 906 includes a hyperlink 916 to the corresponding document and a small portion of text 918 from the document. In some embodiments, search results 906 that have been previously analyzed by a user include one or more annotations specified by the user, such as ratings 910, labels 912, and/or comments 914. In some embodiments, the ordered list of search results 908 integrates search results that have been previously annotated by the user (e.g., 906-2, 3, 4, 5, 7) with search results that have not been previously annotated by the user (e.g., 906-1 and 906-6).

FIG. 10 depicts an exemplary graphical user interface (GUI) 1000 that permits a user to organize and search documents previously annotated by the user in accordance with one embodiment of the invention. In some embodiments, user ratings GUI 1000 is accessed by clicking on user ratings icon 504 in toolbar 500 (FIG. 5). In some embodiments, user ratings GUI 1000 includes the following elements, or a subset or superset thereof: a search text input box 1002; search initiation icon 1004 for searching within documents previously annotated by the user; search initiation icon 1006 for searching the Web; community link 1010 that links to a summary of documents annotated by a plurality of users; filter selector 1012 that reduces the annotated document summaries 1018 shown in ratings GUI 1000 by applying various filters to the user's record 700 (e.g., showing annotated document summaries 1018: with 3 or more stars, with less than 3 stars, rated trash/spam, with public ratings, with private ratings, or show all (no filter)); sort selector 1014 that lets a user choose to list the annotated document summaries 1018 by rating, by date, by page name, by one or more labels, or other criteria; labels 1016 specified by the user; and annotated document summaries 1018 consistent with the search input 1002, filter 1012, sorting 1014, and/or label 1016 specified by the user. Edit link 1020 provides a link to the user annotation GUI 600 (FIG. 6) so that the user can edit the user's annotations for the corresponding document.

FIGS. 11A and 11B depict exemplary graphical user interfaces 1100A and 1100B that permit a user to organize and search documents previously annotated by a plurality of users in accordance with one embodiment of the invention. In some embodiments, community ratings GUI 1100A is accessed by clicking on community ratings icon 506 in toolbar 500 (FIG. 5) or community link 1010 (FIG. 10). In some embodiments, community ratings GUIs 1100A and 1100B include the following features, or a subset or superset thereof: a search text input box 1102; search initiation icon 1104 for searching within documents previously annotated by the plurality of users; search initiation icon 1106 for searching the Web; and personal link 1108 that links to a summary of the user's annotated documents.

In some embodiments, community ratings GUI 1100A includes lists of labels specified by one or more users in the plurality of users. In some embodiments, the lists include a list of active labels 1112 and recent labels 1114. In some embodiments, active labels are identified based on a weighted combination of frequency and recency of use of the label. In some embodiments, community ratings GUI 1100A includes a list of users that are top raters 1116. In some embodiments, a top rater is one of the top Z users in the plurality of users that has entered the most labels, where Z is an integer. In some embodiments, a top rater is one of the top Z users in the plurality of users that has entered ratings, labels, and/or comments that are deemed most helpful by the plurality of users (e.g., based on feedback from users examining the top rater's public annotations of documents).

In some embodiments, community ratings GUI 1100B includes annotated document summaries 1122 for a particular label 1120. For a given annotated document summary (e.g., 1122-1), the label(s) 1126 displayed can be selected in a variety of ways, such as the top N labels by the plurality of users (i.e., the labels selected by the most users), the most recent labels by the plurality of users, or the labels by one or more top raters. Similarly, for a given annotated document summary 1122, the comment(s) 1128 displayed can be selected in a variety of ways, such as the most recent comment(s) by the plurality of users, or the comment(s) by one or more top raters. In some embodiments, community ratings GUI 1100B includes filter selector 1124 that reduces the annotated document summaries 1122 shown by applying various filters (e.g., showing annotated document summaries 1122: with 3 or more stars, with less than 3 stars, rated trash/spam, with public ratings, or show all (no filter)). In some embodiments, community ratings GUI 1100B includes sort selector 1118 that lets a user choose to list the annotated document summaries 1122 for a particular label 1120 by rating, by date, by page name, or other criteria. Edit rating link 1132 provides a link to the user annotation GUI 600 (FIG. 6) so that the user can edit the user's annotations for the corresponding document. Clicking on the community ratings link 1130 for any document summary 1122, links the user to the community ratings for that document.

Using User-Specified Annotations to Modify Search Results

Figure 12:
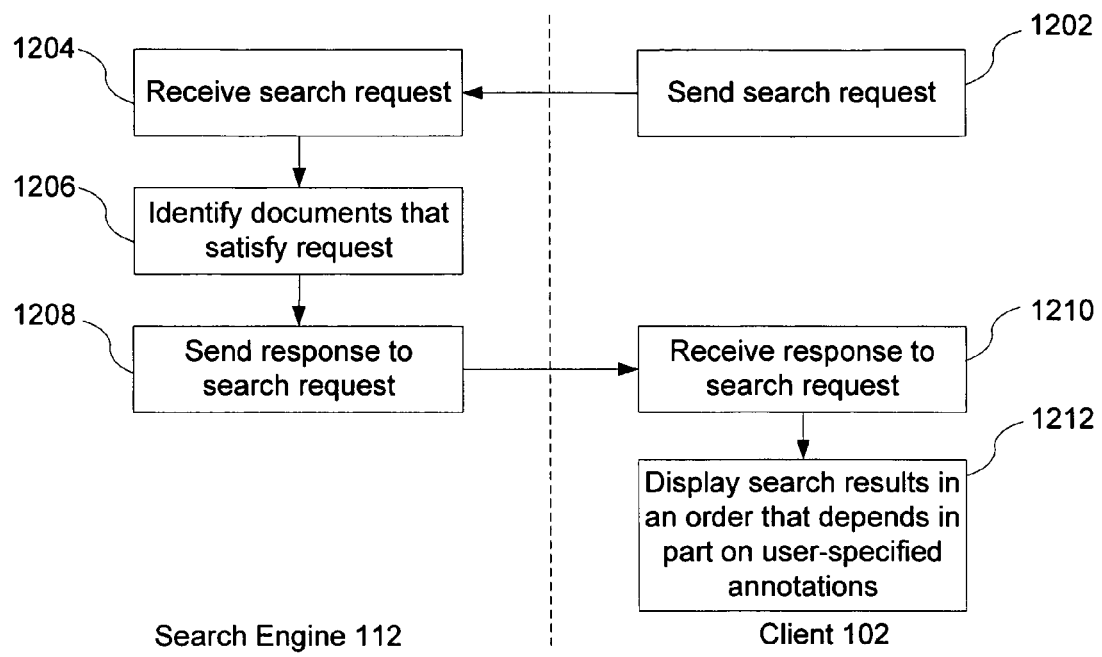
FIG. 12 is a flowchart representing a method of using user-specified annotations to modify search results in accordance with one embodiment of the invention.

FIG. 12 is a flowchart representing a method of using user-specified annotations to modify search results in accordance with one embodiment of the invention. It will be appreciated by those of ordinary skill in the art that one or more of the acts described may be performed by hardware, software, or a combination thereof, as may be embodied in one or more computing systems.

Client 102 sends (1202) a search request input by a user to search engine 112 via communications network 106. The search 112 (e.g., query server 114 in the search engine 112) receives (1204) the search request. In some embodiments, the search request is a request to search the Internet. In some embodiments, client 102 is the computer used by the user to enter login information for the search engine. In some embodiments, the user has previously registered with the search engine.

The search 112 (e.g., query processing controller 118 in the search engine 112) identifies (1206) a plurality of documents that satisfy the search request and sends information (e.g., docIDs and/or URLs) identifying at least some of these documents to query receipt, processing, and response module 122.

Candidate documents for presentation as search results are ordered in accordance with various ranking criteria. In at least some instances, the candidate documents include at least some documents that have previously been rated by the user. In some embodiments, query receipt, processing, and response module 122 identifies the candidate documents previously rated by the user by determining which docIDs or URLs received from query processing controller 118 are contained in the user's record 700 in user information database 116 and include ratings 714 by the user. In some embodiments, query receipt, processing, and response module 122 orders the candidate documents based in part on the ratings specified by the user. For example, a document's PageRank or other score used for ordering, S, can be modified to a revised score, S'. In some embodiments, $S'=S[1+k(r-3)]$ where k is a positive constant between 0 and 0.5 and r is a rating assigned by the user between 1 and 5. For this score adjustment formula, a document that is rated 4 or 5 will have its score increased and, in turn, its position in the search result order promoted. Conversely, a document that is rated 1 or 2 will have its score decreased and, in turn, its position in the search result order demoted. The score for a document rated 3 will remain unchanged. Other formulas that can be used to modify the order of the search results based in part on the user rating include, without limitation, $S'=S(r/3)$; $S'=k \times r$, where k is a constant; and $S'=k^r$, where k is a constant.

The search engine 112 (e.g., query receipt, processing, and response module 122 in the search engine 112) sends (1208) a response to the search request. In some embodiments, the response includes a ranked set of links to at least some of the plurality of documents that satisfy the search request, wherein at least some of the links are to documents that have not previously been rated by the user and at least some of the links are to documents that have previously been rated by the user. In some embodiments, the response includes instructions (e.g., HTML instructions) to display the links in an order that depends at least in part on the ratings of the documents that have previously been rated by the user and that are included in the response. Stated in another way, in some embodiments the ranked set of links in the response are ranked (and ordered for display in the response) at least in part based on the ratings of the documents that have previously been rated by the user and that are included in the response.

Client 102 receives (1210) the response to the search request and displays (1212) at least some of the ranked set of links. The links are displayed in an order that depends at least in part on the ratings of the documents that have previously been rated by the user and that are included in the response. In some embodiments, client 102 also displays one or more corresponding annotations previously created based on the user's input for at least some of the links to documents that have previously been annotated by the user. In some embodiments, the X highest ranked results are returned to client 102 and displayed as an ordered list, wherein X is an integer (e.g., a number between 5 and 50) that is either predefined or chosen based on various system features (e.g., the type of client device, or the size of the display or display region in which the response is to be shown) or user preferences. In some embodiments, the results are presented to the user in a number of smaller page units, each page unit containing a subset of the total number of candidates.

Figures 13A, 13B:
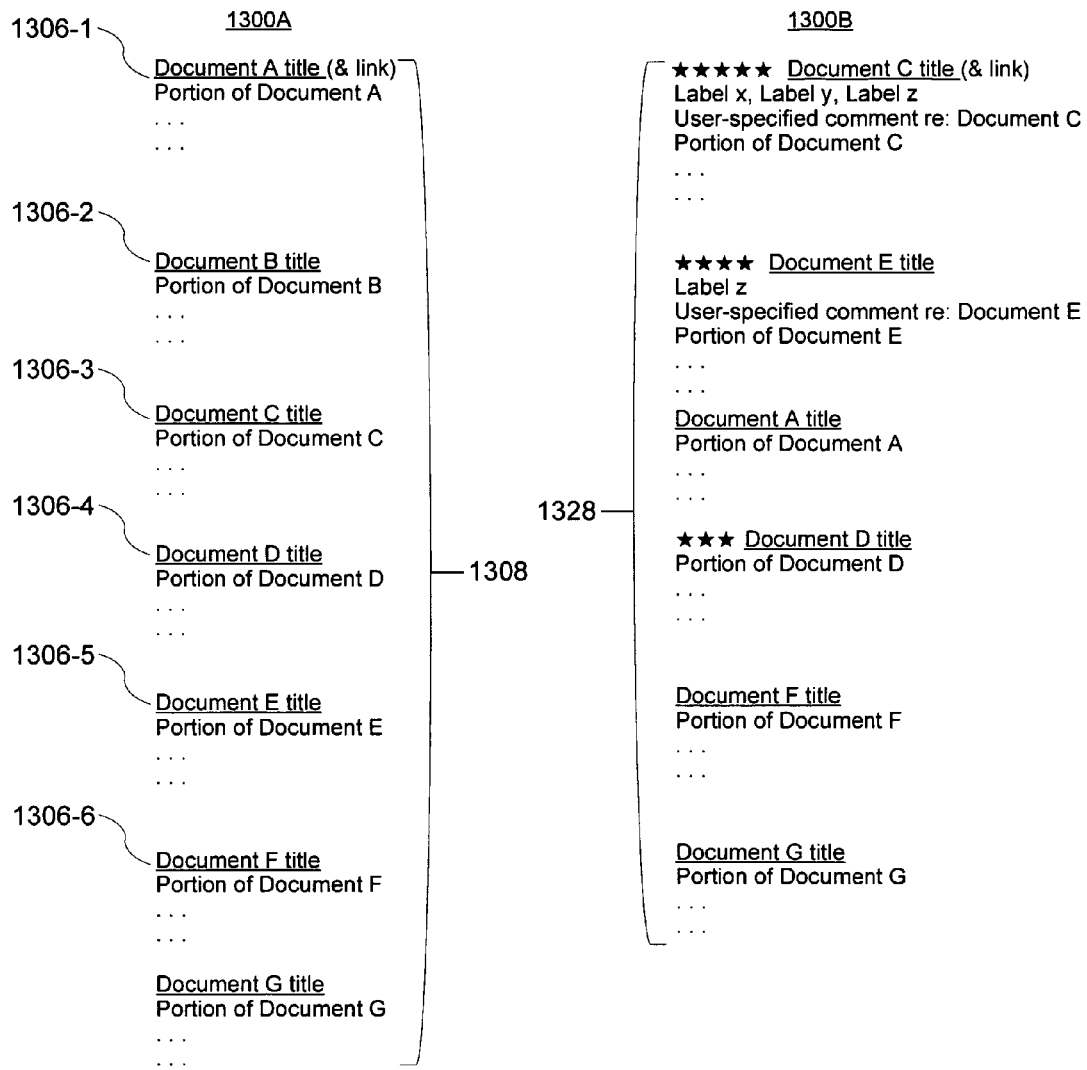
FIGS. 13A and 13B depict exemplary graphical user interfaces 1300A & 1300B showing an ordered list of search results displayed to a user (a) without and (b) with, respectively, ratings specified by the user being taken into account in accordance with one embodiment of the invention.

FIGS. 13A and 13B depict exemplary graphical user interfaces 1300A and 1300B showing an ordered list of search results displayed to a user without (1300A) and with (1300B), respectively, ratings specified by the user being taken into account in accordance with one embodiment of the invention.

GUI 1300A shows an ordered list 1308 of search results 1306. In this example, documents A-G were the top seven documents found by search engine 112 that matched the search criteria input by the user, without taking into consideration any ratings specified by the user. In this example, suppose the user analyzed document B, found it not very useful, and used annotation GUI 600 to assign it a low rating (e.g., 1 star or trash/spam). Similarly, suppose the user analyzed document C and gave it a high rating (e.g., 5 stars); analyzed document D and gave it an average rating (e.g., 3 stars); and analyzed document E and gave it a good rating (e.g., 4 stars). The user may have also analyzed document A (which was ranked highest by search engine 112 without considering ratings specified by the user), document F, and/or document G, but the user did not specify any ratings for these documents.

As shown in 1300B, if the user then initiates another search using the same search criteria, the order in the new list 1328 of search results will depend at least in part on the user's ratings of the documents. For example, the query receipt, processing and response module 122 increases the score given to document C because the user gave document C a 5-star rating, which in turn moves document C up in the new ordered list 1328. Similarly, the query receipt, processing and response module 122 increases the score given to document E because the user gave document E a 4-star rating, thereby promoting document E in the new ordered list 1328. On the other hand, the query receipt, processing and response module 122 decreases the score given to document B because the user gave document B a low (1-star or spam) rating so that it no longer appears in the top search results. The query receipt, processing and response module 122 leaves the score given to document D unchanged because the user gave document D an average (e.g., 3-star) rating, so document D remains below (unrated) document A in the new ordered list 1328. In this example, the ordered list of search results 1328 integrates search results that have been previously annotated by the user (e.g., documents C, D, and E) with search results that have not been previously annotated by the user (e.g., documents A, F, and G).

In some embodiments, an icon (not shown) can be provided in GUI 1300B that permits the user to view search results in an order that does not take into account the user specified ratings. For the example shown in FIGS. 13 A & 13B, when this icon is activated, the search result order changes from C-E-A-D-F-G (1300B) to A-B-C-D-E-F (1300A), with or without the user-specified annotations still visible.

Making and Using Web Site Ratings Derived from User-Specified Annotations

Figure 14:
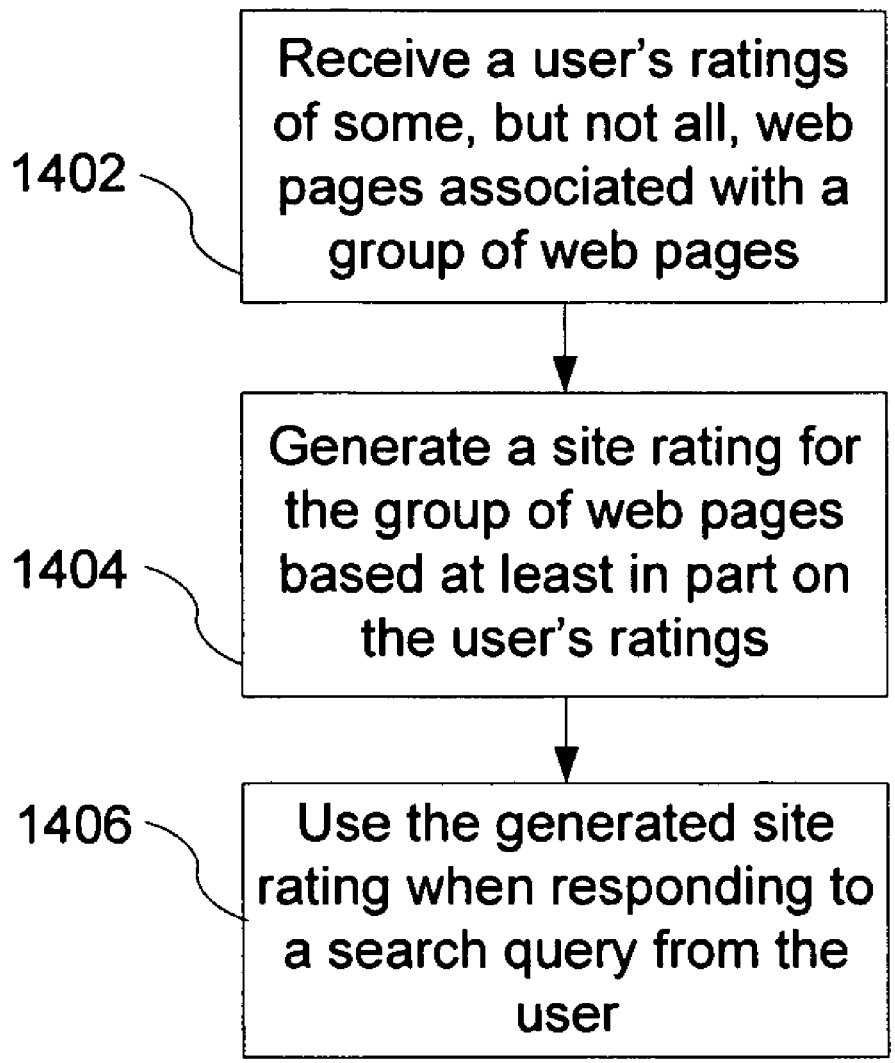
FIG. 14 is a flowchart representing a method of making and using web site ratings derived from annotations specified by a user in accordance with one embodiment of the invention.
Figure 15:
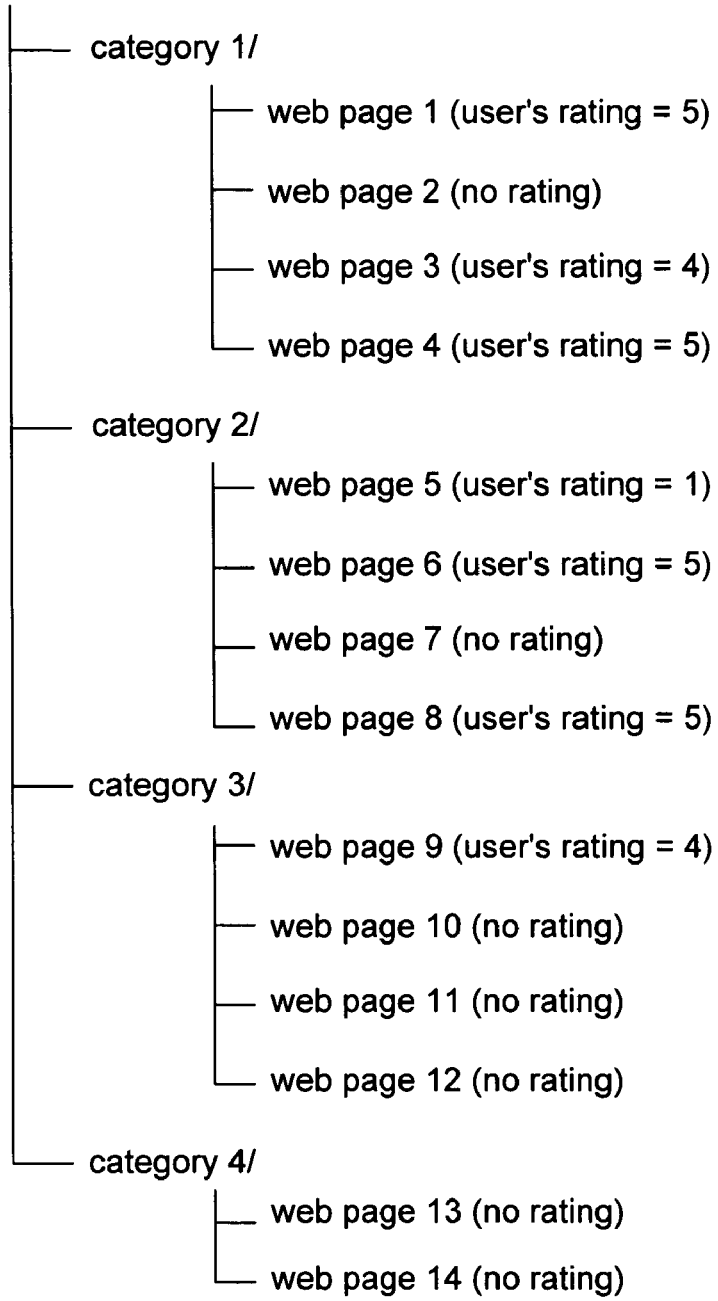
FIG. 15 is a schematic site map of an exemplary web site with ratings specified by a user for some of the web pages in the web site.

FIG. 14 is a flowchart representing a method of making and using web site ratings derived from annotations specified by a user in accordance with one embodiment of the invention. It will be appreciated by those of ordinary skill in the art that one or more of the acts described may be performed by hardware, software, or a combination thereof, as may be embodied in one or more computing systems. FIG. 15 is a schematic site map of an exemplary web site with ratings specified by a user for some of the web pages in the web site.

The search engine 112 (e.g., query server 114 in search engine 112) receives (1402) a user's ratings of some, but not all, web pages associated with a group of web pages (e.g., ratings for web pages 1, 3, 4, 5, 6, 8, & 9 in FIG. 15). In some embodiments, the group of web pages are web pages in a particular web site (e.g., web pages in www.abc.com in FIG. 15). In some embodiments, the group of web pages are web pages in a particular subunit of a web site (e.g., web pages in www.abc.com/category 1 in FIG. 15). In some embodiments, as described above, the user inputs ratings for the web pages to client 102 using annotation GUI 600 and client 102 sends this information to search engine 112.

Query server 114 stores the rating information in the user's record 700 in user information database 116.

In some embodiments, user information processing module 124, or more generally query server 114 identifies the particular web site (e.g., www.abc.com in FIG. 15) and/or the particular subunit of the web site (e.g., "www.abc.com/category 1" in FIG. 15) to which the received user's ratings belong.

User information processing module 124 or query server 114 generates (1404) a user-specific site rating for the group of web pages based on the user's ratings for web pages in the group of web pages.

For example, for the group of web pages in category 1 of www.abc.com, the site rating could be the average of the user's ratings within category 1 ($[5+4+5]/3=4.7$). Alternatively, the site rating for "www.abc.com/category 1" could be: the median of the user's ratings within category 1 (5) or a weighted average of the user's ratings within category 1 ([5+4+5]/3=4.7) and the user's ratings of pages at www.abc.com that are outside category 1 ([1+5+5+4]/4=3.75). In some embodiments, the user's ratings inside category 1 are given more weight than the user's ratings outside category 1 (e.g., 0.8(4.7)+0.2(3.75)=4.5). By giving a non-zero weight to the user's ratings that are outside category 1, the overall "reputation" of www.abc.com with the user is factored into the user's rating for category 1.

For the group of web pages in www.abc.com, the site rating could be the average of the user's ratings within www.abc.com ([5+4+5+1+5+5+4]/7=4.1). Alternatively, the site rating for www.abc.com could be: the median of the user's ratings within www.abc.com (5).

Query receipt, processing and response module 122 uses (1406) the generated site rating for the group of web pages when responding to a search query from the user.

In some embodiments, the site rating is used to promote or demote web pages within the site that match the search query, but which have not been rated by a user. For example, if web page 7 in FIG. 15 matched the user's search query, web page 7 could be given the average site rating for www.abc.com/category 2 ([1+5+5]/3=3.7); the median site rating for www.abc.com/category 2 (5); the average site rating for www.abc.com ([5+4+5+1+5+5+4]/7=4.1); or the median of the user's ratings within www.abc.com (5); and the position of web page 7 in the search results could be promoted (or demoted) accordingly. If the user's ratings indicate that the user likes search results from a particular web site (e.g., wikipedia.org), search results from other pages at that web site that have not been annotated by the user can be promoted using the site rating.

In some embodiments, the site rating is used in place of a user-specified rating 910 in GUI 900 when the corresponding document has not been annotated by the user, but other documents at the web site with the corresponding document have been rated by the user.

In some embodiments, the rating given to a web page or other document can be assigned hierarchically. That is, if the user has specified a rating for the particular web page, then that rating is used. If the user has not specified a rating for the particular web page, then the site rating of the smallest group of web pages that includes the web page is used. If the user has not specified a rating for any of the web pages in the smallest group of web pages that includes the web page, then the site rating of the next larger group of web pages that includes the web page is used, and so on. For example, in FIG. 15, web page 10 can be assigned the site rating given to www.abc.com/category 3 based on the user's rating of web page 9. However, web page 13 is given the site rating for www.abc.com because no ratings were specified by the user for web pages in category 4.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising: at a search engine having one or more processors and memory storing one or more programs to be executed by the one or more processors so as to perform the method:
    receiving a user's ratings of some, but not all, web pages in a group of web pages, the group of web pages selected from the group consisting of web pages in a particular web site and web pages in a particular subunit of a web site, wherein the user comprises a single user;
    generating a user-specific site rating for the group of web pages based on the user's ratings of some, but not all, web pages in the group of web pages, wherein the user-specific site rating is distinct from respective user-specific site ratings of other users for the group of web pages;
    receiving a search request sent by a computer associated with the user;
    identifying a plurality of web pages that satisfy the search request, wherein a first respective web page of the plurality of web pages has not previously been rated by the user and is in the group of web pages for which the user-specific site rating was generated; and
    sending a response to the search request, the response including:
        a ranked set of links to at least some of the plurality of web pages that satisfy the search request, wherein the ranked set of the links includes a link to the first respective web page, wherein the link to the first respective web page is ranked in accordance with the user-specific site rating; and
        instructions to display the ranked set of links, including the link to the first respective web page, in an order that depends at least in part on the user-specific site rating.

2. The method of claim 1, wherein identifying web pages that satisfy the search request includes searching the ratings by the user in accordance with the search request.

3. The method of claim 1, wherein the links to web pages that have not previously been rated by the user include links to web pages previously-rated by other users.

4. The method of claim 1, wherein the response includes a plurality of sorting options for sorting the links in the ranked set of links.

5. The method of claim 1, wherein the links in the ranked set of links are ordered according to a plurality of ranking criteria.

6. The method of claim 1, wherein the response includes, for a link in the ranked set of links, instructions for displaying a rating by the user for a web site corresponding to the link.

7. The method of claim 1, wherein the response to the search request includes suggested labels for display.

8. The method of claim 1, wherein the user-specific site rating is selected from the group consisting of: an average of the user's ratings of rated pages in the group of web pages, a median of the user's ratings of rated pages in the group of web pages, and a weighted average of the user's ratings of rated pages in the group or web pages and the user's ratings of rated pages outside of the group of web pages.

9. The method of claim 1, further comprising:
    receiving ratings from a user for at least one web page associated with the group of web pages; and
    storing the ratings at a server.

10. The method of claim 1, further comprising storing the user's ratings in a user information database.

11. The method of claim 1, wherein the response includes, instructions for displaying the user-specific site rating with the link to the first respective web page.

12. A search engine, comprising:
a main memory;
one or more processors; and
one or more programs, stored in the main memory and executed by the one or more processors, the one or more programs including:
   instructions for receiving a user's ratings of some, but not all, web pages associated with a group of web pages, the group of web pages selected from the group consisting of web pages in a particular web site and web pages in a particular subunit of a web site, wherein the user comprises a single user;
   instructions for generating a user-specific site rating for the group of web pages based on the user's ratings of some, but not all, web pages in the group of web pages, wherein the user-specific site rating is distinct from respective user-specific site ratings of other users for the group of web pages;
   instructions for receiving a search request sent by a computer associated with the user;
   instructions for identifying a plurality of web pages that satisfy the search request, wherein a first respective web page of the plurality of web pages has not previously been rated by the user and is in the group of web pages for which the user-specific site rating was generated; and
   instructions for sending a response to the search request, the response including:
      a ranked set of links to at least some of the plurality of web pages that satisfy the search request, wherein the ranked set of the links includes a link to the first respective web page, wherein the link to the first respective web page is ranked in accordance with the user-specific site rating; and
      instructions to display the ranked set of links, including the link to the first respective web page, in an order that depends at least in part on the user-specific site rating.

13. A non-transitory computer readable storage medium storing one or more programs for execution by one or more processors of a respective computer system, the one or more programs comprising:
   instructions for receiving a user's ratings of some, but not all, web pages associated with a group of web pages, the group of web pages selected from the group consisting of web pages in a particular web site and web pages in a particular subunit of a web site, wherein the user comprises a single user;
   instructions for generating a user-specific site rating for the group of web pages based on the user's ratings of some, but not all, web pages in the group of web pages, wherein the user-specific site rating is distinct from respective user-specific site ratings of other users for the group of web pages;
   instructions for receiving a search request sent by a computer associated with the user;
   instructions for identifying a plurality of web pages that satisfy the search request, wherein a first respective web page of the plurality of web pages has not previously been rated by the user and is in the group of web pages for which the user-specific site rating was generated; and
   instructions for sending a response to the search request, the response including:
      a ranked set of links to at least some of the plurality of web pages that satisfy the search request, wherein the ranked set of the links includes a link to the first respective web page, wherein the link to the first respective web page is ranked in accordance with the user-specific site rating; and
      instructions to display the ranked set of links, including the link to the first respective web page, in an order that depends at least in part on the user-specific site rating.

14. A search engine, comprising:
means for receiving a user's ratings of some, but not all, web pages associated with a group of web pages, the group of web pages selected from the group consisting of web pages in a particular web site and web pages in a particular subunit of a web site, wherein the user comprises a single user;
means for generating a user-specific site rating for the group of web pages based on the user's ratings of some, but not all, web pages in the group of web pages, wherein the user-specific site rating is distinct from respective user-specific site ratings of other users for the group of web pages;
means for receiving a search request sent by a computer associated with the user;
means for identifying a plurality of web pages that satisfy the search request, wherein a first respective web page of the plurality of web pages has not previously been rated by the user and is in the group of web pages for which the user-specific site rating was generated; and
means for sending a response to the search request, the response including:
   a ranked set of links to at least some of the plurality of web pages that satisfy the search request, wherein the ranked set of the links includes a link to the first respective web page, wherein the link to the first respective web page is ranked in accordance with the user-specific site rating; and
   instructions to display the ranked set of links, including the link to the first respective web page, in an order that depends at least in part on the user-specific site rating.

15. The search engine of claim 12, wherein the response to the search request includes suggested labels for display.

16. The search engine of claim 12, wherein the instructions for identifying web pages that satisfy the search request include instructions for searching the ratings by the user in accordance with the search request.

17. The search engine of claim 12, wherein the links to web pages that have not previously been rated by the user include links to web pages previously-rated by other users.

18. The search engine of claim 12, wherein the response includes a plurality of sorting options for sorting the links in the ranked set of links.

19. The search engine of claim 12, wherein the links in the ranked set of links are ordered according to a plurality of ranking criteria.

20. The search engine of claim 12, wherein the response includes, for a link in the ranked set of links, instructions for displaying a rating by the user for a web site corresponding to the link.

21. The search engine of claim 12, wherein the user-specific site rating is selected from the group consisting of: an average of the user's ratings of rated pages in the group of web pages, a median of the user's ratings of rated pages in the group of web pages, and a weighted average of the user's ratings of rated pages in the group or web pages and the user's ratings of rated pages outside of the group of web pages.

22. The search engine of claim 12, wherein the one or more programs further comprise:
   instructions for receiving ratings from a user for at least one web page associated with the group of web pages; and
   instructions for storing the ratings at a server.

23. The search engine of claim 12, wherein the one or more programs further comprise instructions for storing the user's ratings in a user information database.

24. The search engine of claim 12, wherein the response includes, instructions for displaying the user-specific site rating with the link to the first respective web page.

25. The non-transitory computer readable storage medium of claim 13, wherein the response to the search request includes suggested labels for display.

26. The non-transitory computer readable storage medium of claim 13, wherein the instructions for identifying web pages that satisfy the search request include instructions for searching the ratings by the user in accordance with the search request.

27. The non-transitory computer readable storage medium of claim 13, wherein the links to web pages that have not previously been rated by the user include links to web pages previously-rated by other users.

28. The non-transitory computer readable storage medium of claim 13, wherein the response includes a plurality of sorting options for sorting the links in the ranked set of links.

29. The non-transitory computer readable storage medium of claim 13, wherein the links in the ranked set of links are ordered according to a plurality of ranking criteria.

30. The non-transitory computer readable storage medium of claim 13, wherein the response includes, for a link in the ranked set of links, instructions for displaying a rating by the user for a web site corresponding to the link.

31. The non-transitory computer readable storage medium of claim 13, wherein the user-specific site rating is selected from the group consisting of: an average of the user's ratings of rated pages in the group of web pages, a median of the user's ratings of rated pages in the group of web pages, and a weighted average of the user's ratings of rated pages in the group or web pages and the user's ratings of rated pages outside of the group of web pages.

32. The search engine of claim 12, wherein the one or more programs further comprise:
   instructions for receiving ratings from a user for at least one web page associated with the group of web pages; and
   instructions for storing the ratings at a server.

33. The search engine of claim 12, wherein the one or more programs further comprise instructions for storing the user's ratings in a user information database.

34. The search engine of claim 12, wherein the response includes, instructions for displaying the user-specific site rating with the link to the first respective web page.

* * * * *